(12) United States Patent
Yang et al.

(10) Patent No.: US 12,413,985 B1
(45) Date of Patent: Sep. 9, 2025

(54) NEAR-FIELD BEAM SEARCH METHOD AND APPARATUS, AND STORAGE MEDIUM

(71) Applicant: DATANG MOBILE COMMUNICATIONS EQUIPMENT CO., LTD., Beijing (CN)

(72) Inventors: Xianjun Yang, Beijing (CN); Xin Su, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 18/878,877

(22) PCT Filed: Jun. 9, 2023

(86) PCT No.: PCT/CN2023/099534
§ 371 (c)(1),
(2) Date: Dec. 25, 2024

(87) PCT Pub. No.: WO2024/001729
PCT Pub. Date: Jan. 4, 2024

(30) Foreign Application Priority Data

Jun. 30, 2022 (CN) .......................... 202210761534.0

(51) Int. Cl.
*H04W 16/28* (2009.01)
(52) U.S. Cl.
CPC .................................. *H04W 16/28* (2013.01)
(58) Field of Classification Search
CPC .................................................... H04W 16/28
See application file for complete search history.

(56) References Cited

U.S. PATENT DOCUMENTS

2018/0262918 A1\* 9/2018 Zhao .................... H04B 7/0695
2019/0222275 A1 7/2019 Mo et al.
(Continued)

FOREIGN PATENT DOCUMENTS

| CN | 107534467 A | 1/2018 |
| CN | 111200456 A | 5/2020 |
| CN | 113746520 A | 12/2021 |

OTHER PUBLICATIONS

State Intellectual Property Office of the People's Republic of China, International Search Report and written opinion issued in Application No. PCT/CN2023/099534, Sep. 9, 2023, 13 pages.

*Primary Examiner* — Kenneth T Lam
(74) *Attorney, Agent, or Firm* — KILPATRICK TOWNSEND & STOCKTON LLP

(57) ABSTRACT

A near-field beam search method, including: a base station determines a grid where a terminal is located from at least one type of preset grid of a near-field coverage range of the base station; the base station determines a target transmitting beam codebook according to the grid and a base station transmitting beam codebook set corresponding to the preset grid, where the base station transmitting beam codebook set includes a transmitting beam codebook corresponding to each grid in the preset grid; the base station sends information of the target transmission beam codebook to the terminal, and the terminal determines a target receiving beam codebook from a terminal receiving beam codebook set corresponding to the preset grid according to the information; the base station sends a signal to the terminal by using the target transmitting beam codebook, and the terminal receives the signal by using the target receiving beam codebook.

20 Claims, 16 Drawing Sheets

(56) References Cited

U.S. PATENT DOCUMENTS

| | | | |
|---|---|---|---|
| 2021/0058131 A1* | 2/2021 | Zhu | H04B 7/088 |
| 2021/0126684 A1* | 4/2021 | Chen | H04B 7/0482 |
| 2022/0030442 A1* | 1/2022 | Laghate | H04W 76/15 |
| 2023/0319760 A1* | 10/2023 | Raghavan | H04B 17/318 |
| | | | 455/456.1 |
| 2023/0379120 A1* | 11/2023 | Kim | H04L 5/006 |
| 2024/0275433 A1* | 8/2024 | Li | H04B 17/391 |
| 2024/0421954 A1* | 12/2024 | Jung | H04L 5/0051 |

\* cited by examiner

NEAR-FIELD BEAM SEARCH METHOD AND APPARATUS, AND STORAGE MEDIUM

CROSS-REFERENCE TO RELATED APPLICATION

The present application is a National stage of International Application No. PCT/CN2023/099534, which claims priority to Chinese Patent Application No. 202210761534.0, entitled "NEAR-FIELD BEAM SEARCH METHOD AND APPARATUS, AND STORAGE MEDIUM", filed with the China National Intellectual Property Administration on Jun. 30, 2022, both of which are hereby incorporated by reference in their entireties.

FIELD

The present application relates to the field of communication technologies and, in particular, to a near-field beam search method and apparatus, and a storage medium.

BACKGROUND

In 6G, a combination of ultra large scale antenna, holographic MIMO (Multiple Input Multiple Output, multiple input multiple output) and extremely high frequency communication (such as, terahertz THz technology) makes it possible for a terminal to be in a near-field range of a base station, rather than far-field communication in 4G and 5G. Under the near-field condition, the original plane wave hypothesis of electromagnetic waves reaching the base station is no longer valid, and the spherical wave hypothesis should be used instead. In 4G and 5G, processing of far-field plane wave signals can direct a beam towards a specific direction, while in 6G, processing of spherical wave signals enables a beam to focus on a specific position, that is, it makes beam focusing possible.

However, the current beam search applicable to far-field communication only searches in different directions and has not been refined to specific locations, and cannot be directly used for beam search under near-field beam focusing. If a method of beam search is used not only for the beam direction but also for the distance, the computational complexity is high, the search time is long, which cannot meet the communication requirement of low latency.

SUMMARY

The present disclosure provides a near-field beam search method and apparatus, and a storage medium, to reduce the time overhead and complexity of beam search in near-field communication scenarios, and improve the accuracy of beam search.

In one embodiment of the present disclosure provides a near-field beam search method, applied to a terminal, the method includes:
  receiving information of a target transmitting beam codebook sent by a base station; where the target transmitting beam codebook is a transmitting beam codebook corresponding to a grid where the terminal is located and being from a base station transmitting beam codebook set corresponding to a preset grid of a near-field coverage range of the base station;
  determining, according to the information of the target transmitting beam codebook, a corresponding target receiving beam codebook from a terminal receiving beam codebook set corresponding to the preset grid; and
  receiving, using the target receiving beam codebook, a signal sent by the base station using the target transmitting beam codebook.

In a possible design, the receiving the information of the target transmitting beam codebook sent by the base station includes:
  receiving information of the base station transmitting beam codebook set and information of the target transmitting beam codebook sent by the base station; where the information of the base station transmitting beam codebook set is associated with the terminal receiving beam codebook set;
  the determining, according to the information of the target transmitting beam codebook, the corresponding target receiving beam codebook from the terminal receiving beam codebook set corresponding to the preset grid includes:
  determining, according to the information of the base station transmitting beam codebook set, the terminal receiving beam codebook set associated with the base station transmitting beam codebook set, and determining, according to the information of the target transmitting beam codebook, the corresponding target receiving beam codebook from the terminal receiving beam codebook set.

In a possible design, the information of the base station transmitting beam codebook set includes a first identifier corresponding to the base station transmitting beam codebook set including the target transmitting beam codebook: the information of the target transmitting beam codebook includes a second identifier corresponding to the target transmitting beam codebook:
  the determining, according to the information of the target transmitting beam codebook, the corresponding target receiving beam codebook from the terminal receiving beam codebook set corresponding to the preset grid includes:
  searching for, according to the first identifier, the terminal receiving beam codebook set associated with the base station transmitting beam codebook set, and searching for, from the terminal receiving beam codebook set according to the second identifier and a preset mapping relationship between receiving and transmitting beam codebooks, the target receiving beam codebook corresponding to the target transmitting beam codebook.

In a possible design, before receiving the information of the target transmitting beam codebook sent by the base station, the method further includes:
  receiving and storing the terminal receiving beam codebook set and a preset mapping relationship between receiving and transmitting beam codebooks broadcast by the base station.

In one embodiment of the present disclosure provides a near-field beam search method, applied to a base station, the method includes:
  obtaining location information of a terminal, and determining, according to the location information of the terminal, a grid where the terminal is located from at least one type of preset grid of a near-field coverage range of the base station;
  determining a target transmitting beam codebook according to the grid where the terminal is located and a base station transmitting beam codebook set corresponding to the preset grid, where the base station transmitting beam codebook set includes a transmitting beam codebook corresponding to each grid in the preset grid;

sending information of the target transmitting beam codebook to the terminal, where the information of the target transmitting beam codebook is associated with a target receiving beam codebook from a terminal receiving beam codebook set associated with the base station transmitting beam codebook set, and the target receiving beam codebook is configured for the terminal to receive a to-be-sent signal of the base station; and sending, using the target transmitting beam codebook, the to-be-sent signal to the terminal.

In a possible design, the preset grid includes an initial grid and at least one shifted grid, and each preset grid corresponds to one type of base station transmitting beam codebook set and one type of terminal receiving beam codebook set: where the shifted grid is generated by shifting the initial grid, and at least one target edge region of each grid in the initial grid is located in a central region of each grid in the shifted grid.

In a possible design, the determining the target transmitting beam codebook according to the grid where the terminal is located and the base station transmitting beam codebook set corresponding to the preset grid includes:

if it is determined that the terminal is located in a central region of any first grid in the initial grid, determining, from a base station transmitting beam codebook set corresponding to the initial grid, a transmitting beam codebook corresponding to the first grid as the target transmitting beam codebook: or if it is determined that the terminal is located in an edge region of any first grid in the initial grid, and it is determined that the terminal is located in a central region of any second grid in the shifted grid, determining, from a base station transmitting beam codebook set corresponding to the shifted grid, a transmitting beam codebook corresponding to the second grid as the target transmitting beam codebook.

In a possible design, the sending the information of the target transmitting beam codebook to the terminal includes:

sending information of the base station transmitting beam codebook set and information of the target transmitting beam codebook to the terminal, where the information of the base station transmitting beam codebook set is associated with a terminal receiving beam codebook set.

In a possible design, the sending the information of the base station transmitting beam codebook set and the information of the target transmitting beam codebook to the terminal includes:

sending a first identifier corresponding to the base station transmitting beam codebook set corresponding to the preset grid and a second identifier corresponding to the target transmitting beam codebook to the terminal, where the first identifier is further configured to associate a terminal receiving beam codebook set associated with the base station transmitting beam codebook set, and the second identifier is further configured to associate the target receiving beam codebook from the terminal receiving beam codebook set that corresponds to the target transmitting beam codebook from the base station transmitting beam codebook set, through a preset mapping relationship between receiving and transmitting beam codebooks.

In a possible design, the method further includes:

dividing the near-field coverage range of the base station into at least one type of preset grid;

configuring, for the preset grid, a base station transmitting beam codebook set and a corresponding terminal receiving beam codebook set, and determining a preset mapping relationship between receiving and transmitting beam codebooks according to a correspondence between respective codebook from the base station transmitting beam codebook set and respective codebook from the corresponding terminal receiving beam codebook set; and broadcasting the terminal receiving beam codebook set and the preset mapping relationship between receiving and transmitting beam codebooks to the terminal.

In a possible design, the preset mapping relationship between receiving and transmitting beam codebooks includes: one transmitting beam codebook corresponding to one receiving beam codebook, and/or, transmitting beam codebooks corresponding to one receiving beam codebook.

In a possible design, the configuring, for the preset grid, the base station transmitting beam codebook set and the corresponding terminal receiving beam codebook set includes:

configuring, for each grid in the preset grid, a transmitting beam codebook and a corresponding receiving beam codebook, and beam focusing corresponding to a codebook configured for any grid covers the grid, where a transmitting beam codebook configured for respective grid in the preset grid constitutes the base station transmitting beam codebook set, and a receiving beam codebook configured for respective grid constitutes the base station transmitting beam codebook set.

In a possible design, the dividing the near-field coverage range of the base station into the at least one type of preset grid includes:

dividing an initial grid for the near-field coverage range of the base station; and shifting the initial grid by using at least one preset shifting manner to obtain at least one type of shifted grid, and at least one edge region of each grid in the initial grid is located in a central region of each grid in the at least one type of shifted grid.

In a possible design, the dividing the initial grid for the near-field coverage range of the base station includes:

dividing the initial grid for the near-field coverage range of the base station in a rectangular coordinate system or a polar coordinate system.

In a possible design, the dividing the initial grid for the near-field coverage range of the base station in the rectangular coordinate system or the polar coordinate system includes:

dividing, in the rectangular coordinate system by taking a location of the base station as an origin, the initial grid for the near-field coverage range of the base station at equal distances along an x-axis and a y-axis according to a beam focusing range: or dividing, in the polar coordinate system by taking a location of the base station as a pole, the initial grid for the near-field coverage range of the base station with a preset angle and a preset distance at equal intervals according to a beam focusing range.

In a possible design, the shifting the initial grid by using the at least one preset shifting manner to obtain the at least one type of shifted grid, includes:

for the initial grid in the rectangular coordinate system, shifting the initial grid along a positive direction and/or a negative direction of an x-axis to obtain the at least one type of shifted grid, and an edge region of a preset range around a side parallel to a y-axis of each grid in the initial grid is located in a central region of each grid in the shifted grid; and/or shifting the initial grid along a positive direction and/or a negative direction of a y-axis to obtain the at least one type of shifted grid, and an edge region of a preset range around a side parallel to an x-axis of each grid in the initial grid is located in a central region of each grid in the shifted grid; and/or shifting the initial grid along at least one direction at a preset angle to an x-axis to obtain a shifted grid, and an edge region of a preset range around a vertex of each grid in the initial grid is located in a central region of each grid in the shifted grid.

In a possible design, the shifting the initial grid by using the at least one preset shifting manner to obtain the at least one type of shifted grid includes:

for the initial grid in the polar coordinate system, enlarging and/or reducing the initial grid along a polar axis with a pole as a center to obtain the at least one type of shifted grid, and an edge region of a preset range around an arc side of each grid in the initial grid is located in a central region of each grid in the shifted grid; and/or rotating the initial grid clockwise and/or counterclockwise with a pole as a center to obtain the at least one type of shifted grid, and an edge region of a preset range around a side along a polar diameter direction of each grid in the initial grid is located in a central region of each grid in the shifted grid; and/or enlarging and/or reducing the initial grid along a polar axis with a pole as a center, and rotating the initial grid clockwise and/or counterclockwise with the pole as a center, to obtain the at least one type of shifted grid, and an edge region of a preset range around a vertex of each grid in the initial grid is located in a central region of each grid in the shifted grid.

In one embodiment of the present disclosure provides a terminal including a memory, a transceiver, and a processor, where the memory is configured to store a computer program: the transceiver is configured to transmit and receive data under control of the processor; and the processor is configured to read the computer program from the memory and perform following operations:

receiving information of a target transmitting beam codebook sent by a base station: where the target transmitting beam codebook is a transmitting beam codebook corresponding to a grid where the terminal is located and being from a base station transmitting beam codebook set corresponding to a preset grid of a near-field coverage range of the base station;

determining, according to the information of the target transmitting beam codebook, a corresponding target receiving beam codebook from a terminal receiving beam codebook set corresponding to the preset grid; and controlling the transceiver to receive, using the target receiving beam codebook, a signal sent by the base station using the target transmitting beam codebook.

In a possible design, in the process of receiving the information of the target transmitting beam codebook sent by the base station, the processor is configured to:

receive information of the base station transmitting beam codebook set and information of the target transmitting beam codebook sent by the base station; where the information of the base station transmitting beam codebook set is associated with the terminal receiving beam codebook set;

in the process of determining, according to the information of the target transmitting beam codebook, the corresponding target receiving beam codebook from the terminal receiving beam codebook set corresponding to the preset grid, the processor is configured to:

determine, according to the information of the base station transmitting beam codebook set, the terminal receiving beam codebook set associated with the base station transmitting beam codebook set, and determining, according to the information of the target transmitting beam codebook, the corresponding target receiving beam codebook from the terminal receiving beam codebook set.

In a possible design, the information of the base station transmitting beam codebook set includes a first identifier corresponding to the base station transmitting beam codebook set including the target transmitting beam codebook: the information of the target transmitting beam codebook includes a second identifier corresponding to the target transmitting beam codebook:

in the process of determining, according to the information of the target transmitting beam codebook, the corresponding target receiving beam codebook from the terminal receiving beam codebook set corresponding to the preset grid, the processor is configured to:

search for, according to the first identifier, the terminal receiving beam codebook set associated with the base station transmitting beam codebook set, and searching for, from the terminal receiving beam codebook set according to the second identifier and a preset mapping relationship between receiving and transmitting beam codebooks, the target receiving beam codebook corresponding to the target transmitting beam codebook.

In a possible design, before receiving the information of the target transmitting beam codebook sent by the base station, the transceiver is further configured to:

receive and store the terminal receiving beam codebook set and a preset mapping relationship between receiving and transmitting beam codebooks broadcast by the base station.

In one embodiment of the present disclosure provides a base station including a memory, a transceiver, and a processor, where the memory is configured to store a computer program: the transceiver is configured to transmit and receive data under control of the processor; and the processor is configured to read the computer program from the memory and perform following operations:

obtaining location information of a terminal, and determining, according to the location information of the terminal, a grid where the terminal is located from at least one type of preset grid of a near-field coverage range of the base station;

determining a target transmitting beam codebook according to the grid where the terminal is located and a base station transmitting beam codebook set corresponding to the preset grid, where the base station transmitting beam codebook set includes a transmitting beam codebook corresponding to each grid in the preset grid;

sending information of the target transmitting beam codebook to the terminal, where the information of the target transmitting beam codebook is associated with a target receiving beam codebook from a terminal receiving beam codebook set associated with the base station transmitting beam codebook set, and the target receiving beam codebook is configured for the terminal to receive a to-be-sent signal of the base station; and sending, using the target transmitting beam codebook, the to-be-sent signal to the terminal.

In a possible design, the preset grid includes an initial grid and at least one shifted grid, and each preset grid corresponds to one type of base station transmitting beam codebook set and one type of terminal receiving beam codebook set: where the shifted grid is generated by shifting the initial grid, and at least one target edge region of each grid in the initial grid is located in a central region of each grid in the shifted grid.

In a possible design, in the process of determining the target transmitting beam codebook according to a position of the grid where the terminal is located and the base station transmitting beam codebook set corresponding to the preset grid, the processor is configured to:

if it is determined that the terminal is located in a central region of any first grid in the initial grid, determine, from a base station transmitting beam codebook set corresponding to the initial grid, a transmitting beam codebook corresponding to the first grid as the target transmitting beam codebook: or if it is determined that the terminal is located in an edge region of any first grid in the initial grid, and it is determined that the terminal is located in a central region of any second grid in the shifted grid, determine, from a base station transmitting beam codebook set corresponding to the shifted grid, a transmitting beam codebook corresponding to the second grid as the target transmitting beam codebook.

In a possible design, in the process of sending the information of the target transmitting beam codebook to the terminal, the processor is configured to:

send information of the base station transmitting beam codebook set and information of the target transmitting beam codebook to the terminal, where the information of the base station transmitting beam codebook set is associated with a terminal receiving beam codebook set.

In a possible design, in the process of sending the information of the base station transmitting beam codebook set and the information of the target transmitting beam codebook to the terminal, the processor is configured to:

send a first identifier corresponding to the base station transmitting beam codebook set corresponding to the preset grid and a second identifier corresponding to the target transmitting beam codebook to the terminal, where the first identifier is further configured to associate a terminal receiving beam codebook set associated with the base station transmitting beam codebook set, and the second identifier is further configured to associate the target receiving beam codebook from the terminal receiving beam codebook set that corresponds to the target transmitting beam codebook from the base station transmitting beam codebook set, through a preset mapping relationship between receiving and transmitting beam codebooks.

In a possible design, the processor is further configured to:

divide the near-field coverage range of the base station into a preset grid;

configure, for the preset grid, a base station transmitting beam codebook set and a corresponding terminal receiving beam codebook set, and determining a preset mapping relationship between receiving and transmitting beam codebooks according to a correspondence between respective codebook from the base station transmitting beam codebook set and respective codebook from the corresponding terminal receiving beam codebook set; and broadcast the terminal receiving beam codebook set and the preset mapping relationship between receiving and transmitting beam codebooks to the terminal.

In a possible design, the preset mapping relationship between receiving and transmitting beam codebooks includes: one transmitting beam codebook corresponding to one receiving beam codebook, and/or, transmitting beam codebooks corresponding to one receiving beam codebook.

In a possible design, in the process of configuring, for the preset grid, the base station transmitting beam codebook set and the corresponding terminal receiving beam codebook set, the processor is configured to:

configure, for each grid in the preset grid, a transmitting beam codebook and a corresponding receiving beam codebook, and beam focusing corresponding to a codebook configured for any grid covers the grid, where a transmitting beam codebook configured for respective grid in the preset grid constitutes the base station transmitting beam codebook set, and a receiving beam codebook configured for respective grid constitutes the base station transmitting beam codebook set.

In a possible design, in the process of dividing the near-field coverage range of the base station into the preset grid, the processor is configured to:

divide an initial grid for the near-field coverage range of the base station; and shift the initial grid by using at least one preset shifting manner to obtain at least one type of shifted grid, and at least one edge region of each grid in the initial grid is located in a central region of each grid in the at least one type of shifted grid.

In a possible design, in the process of dividing the initial grid for the near-field coverage range of the base station, the processor is configured to:

divide the initial grid for the near-field coverage range of the base station in a rectangular coordinate system or a polar coordinate system.

In a possible design, in the process of dividing the initial grid for the near-field coverage range of the base station in the rectangular coordinate system or the polar coordinate system, the processor is configured to:

divide, in the rectangular coordinate system by taking a location of the base station as an origin, the initial grid for the near-field coverage range of the base station at equal distances along an x-axis and a y-axis according to a beam focusing range: or divide, in the polar coordinate system by taking a location of the base station as a pole, the initial grid for the near-field coverage range of the base station with a preset angle and a preset distance at equal intervals according to a beam focusing range.

In a possible design, in the process of shifting the initial grid by using the at least one preset shifting manner to obtain the at least one type of shifted grid, the processor is configured to:

for the initial grid in the rectangular coordinate system, shift the initial grid along a positive direction and/or a negative direction of an x-axis to obtain the at least one type of shifted grid, and an edge region of a preset range around a side parallel to a y-axis of each grid in the initial grid is located in a central region of each grid in the shifted grid; and/or shift the initial grid along a positive direction and/or a negative direction of a y-axis to obtain the at least one type of shifted grid, and an edge region of a preset range around a side parallel to an x-axis of each grid in the initial grid is located in a central region of each grid in the shifted grid; and/or shift the initial grid along at least one direction at a preset angle to an x-axis to obtain a shifted grid, and an edge region of a preset range around a vertex of each grid in the initial grid is located in a central region of each grid in the shifted grid.

In a possible design, in the process of shifting the initial grid by using the at least one preset shifting manner to obtain the at least one type of shifted grid, the processor is configured to:

for the initial grid in the polar coordinate system, enlarge and/or reduce the initial grid along a polar axis with a pole as a center to obtain the at least one type of shifted grid, and an edge region of a preset range around an arc side of each grid in the initial grid is located in a central region of each grid in the shifted grid; and/or rotate the initial grid clockwise and/or counterclockwise with a pole as a center to obtain the at least one type of shifted grid, and an edge region of a preset range around a side along a polar diameter direction of each grid in the initial grid is located in a central region of each grid in the shifted grid; and/or enlarge and/or reduce the initial grid along a polar axis with a pole as a center, and rotate the initial grid clockwise and/or counterclockwise with the pole as a center, to obtain the at least one type of shifted grid, and an edge region of a preset range around a vertex of each grid in the initial grid is located in a central region of each grid in the shifted grid.

In one embodiment of the present disclosure provides a near-field beam search apparatus, including:

a receiving unit, configured to receive information of a target transmitting beam codebook sent by a base station: where the target transmitting beam codebook is a transmitting beam codebook corresponding to a grid where a terminal is located and being from a base station transmitting beam codebook set corresponding to a preset grid of a near-field coverage range of the base station; and a determining unit, configured to determine, according to the information of the target transmitting beam codebook, a corresponding target receiving beam codebook from a terminal receiving beam codebook set corresponding to the preset grid;

the receiving unit is further configured to receive, using the target receiving beam codebook, a signal sent by the base station using the target transmitting beam codebook.

In one embodiment of the present disclosure provides a near-field beam search apparatus, including:

a positioning unit, configured to obtain location information of a terminal, and determine, according to the location information of the terminal, a grid where the terminal is located from at least one type of preset grid of a near-field coverage range of a base station;

a determining unit, configured to determine a target transmitting beam codebook according to the grid where the terminal is located and a base station transmitting beam codebook set corresponding to the preset grid, where the base station transmitting beam codebook set includes a transmitting beam codebook corresponding to each grid in the preset grid; and a sending unit, configured to send information of the target transmitting beam codebook to the terminal, where the information of the target transmitting beam codebook is associated with a target receiving beam codebook from a terminal receiving beam codebook set associated with the base station transmitting beam codebook set, and the target receiving beam codebook is configured for the terminal to receive a to-be-sent signal of the base station; and send, using the target transmitting beam codebook, the to-be-sent signal to the terminal.

In one embodiment of the present disclosure provides a processor-readable storage medium storing a computer program, where the computer program is configured to cause a processor to perform the method as described in the embodiments.

The present disclosure provides a near-field beam search method and apparatus, and a storage medium, in which a base station obtains location information of a terminal, and determines, according to the location information of the terminal, a grid where the terminal is located from at least one type of preset grid of a near-field coverage range of the base station; determines a target transmitting beam codebook according to the grid where the terminal is located and a base station transmitting beam codebook set corresponding to the preset grid, where the base station transmitting beam codebook set includes a transmitting beam codebook corresponding to each grid in the preset grid: sends information of the target transmitting beam codebook to the terminal, and the terminal determines a corresponding target receiving beam codebook from a terminal receiving beam codebook set corresponding to the preset grid according to the information of the target transmitting beam codebook: the base station sends a signal to the terminal by using the target transmitting beam codebook, and the terminal receives by using the target receiving beam codebook. By dividing the near-field coverage range of the base station into the preset grid and configuring the base station transmitting beam codebook set and the terminal receiving beam codebook set accordingly, the target transmitting beam codebook and the target receiving beam codebook used for signal transmission between the base station and the terminal can be quickly and accurately determined based on the location of the terminal in the preset grid, which can reduce the time overhead and complexity of beam search, and improve the accuracy of beam search.

It should be understood that the content described in the summary is not intended to limit a key or important feature of the embodiments of the present disclosure, nor is it intended to limit the scope of the present disclosure. Other features of the present disclosure will be easily understood through the following description.

BRIEF DESCRIPTION OF THE DRAWINGS

In order to more clearly describe the embodiments of the present disclosure or the prior art, in the following, the drawings that need to be used in the description of the embodiments or the prior art will be briefly introduced. Apparently, the drawings in the following description are a part of embodiments of the present disclosure.

DESCRIPTION OF EMBODIMENTS

Figure 1:
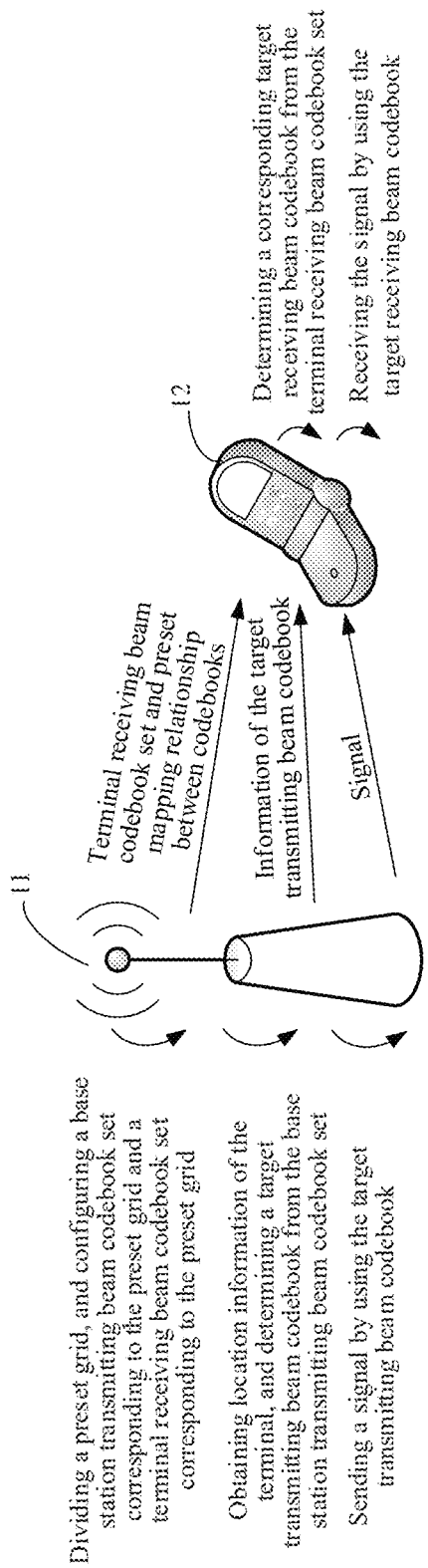
FIG. 1 is a system schematic diagram of a near-field beam search method according to an embodiment of the present disclosure.

The term "and/or" in the present disclosure describes an association relationship between associated objects, indicating that there can be three kinds of relationships, for example, A and/or B, which may indicate that there are three situations: A alone, A and B simultaneously, and B alone. The character "/" generally indicates that the preceding and following associated objects are an "or" relationship.

The term "multiple" in the embodiments of the present disclosure refers to two or more, and other quantifiers are similar.

In 6G, a combination of ultra large scale antenna, holographic MIMO (Multiple Input Multiple Output, multiple input multiple output) and extremely high frequency communication (such as, terahertz THz technology) makes it possible for a terminal to be in a near-field range of a base station, rather than far-field communication in 4G and 5G. Under the near-field condition, the original plane wave hypothesis of electromagnetic waves reaching the base station is no longer valid, and the spherical wave hypothesis should be used instead. In 4G and 5G, processing of far-field plane wave signals can direct a beam towards a specific direction, while in 6G, processing of spherical wave signals enables a beam to focus on a specific position, that is, it makes beam focusing possible.

The existing beam search methods for far-field communication include: an exhaustive search algorithm, a hierarchical search algorithm, etc. The exhaustive search algorithm is the most intuitive and performs the best. Taking the downlink as an example, assuming that a base station has M simulated transmitting beams and a terminal has N simulated receiving beams, the terminal monitors and estimates channel qualities of M×N receiving and transmitting beam pairs through traversal, and then determines the optimal receiving and transmitting beam pair. The exhaustive search algorithm has high computational complexity and long search time. The hierarchical search algorithm is proposed by the IEEE 802.11.ad standard, which divides beam search into stages of different fineness. It first searches in coarse fineness, such as sector search, and then searches in fine fineness, such as beam level search. The computational complexity of the hierarchical search algorithm depends on the fineness of division, and the complexity can be reduced, but the performance may also be reduced.

In another related technology, the method of beam search for both beam direction and distance in near-field communication is to divide the entire beam search into two stages: the first stage is angle beam search, which estimates a direction of a terminal; and the second stage is distance beam search, which estimates a distance between a terminal and a base station.

However, the current beam search applicable to far-field communication only searches in different directions and has not been refined to specific locations, and cannot be directly used for beam search under near-field beam focusing. If a method of beam search is used not only for the beam direction but also for the distance, the computational complexity is high, the search time is long, which cannot meet the communication requirement of low latency:

In order to solve the above problem, the present disclosure provides a near-field beam search method, in which a base station obtains location information of a terminal, and determines, according to the location information of the terminal, a grid where the terminal is located from at least one type of preset grid of a near-field coverage range of the base station; determines a target transmitting beam codebook according to the grid where the terminal is located and a base station transmitting beam codebook set corresponding to the preset grid, where the base station transmitting beam codebook set includes a transmitting beam codebook corresponding to each grid in the preset grid: sends information of the target transmitting beam codebook to the terminal, and the terminal determines a corresponding target receiving beam codebook from a terminal receiving beam codebook set corresponding to the preset grid according to the information of the target transmitting beam codebook: the base station sends a signal to the terminal by using the target transmitting beam codebook, and the terminal receives by using the target receiving beam codebook. By dividing the near-field coverage range of the base station into the preset grid and configuring the base station transmitting beam codebook set and the terminal receiving beam codebook set accordingly, the target transmitting beam codebook and the target receiving beam codebook used for signal transmission between the base station and the terminal can be quickly and accurately determined based on the location of the terminal in the preset grid, which can reduce the time overhead and complexity of beam search, and improve the accuracy of beam search.

As shown in FIG. 1, the system of the near-field beam search method in the present disclosure includes a base station 11 and a terminal 12, where the base station divides the near-field coverage range of the base station into at least one type of preset grid in advance, and configures a base station transmitting beam codebook set and a terminal receiving beam codebook set corresponding to the preset grid. The base station transmitting beam codebook set includes a transmitting beam codebook corresponding to each grid in the preset grid, and the terminal receiving beam codebook set includes a receiving beam codebook corresponding to each grid in the preset grid. The base station 11 broadcasts the terminal receiving beam codebook set and a preset mapping relationship between receiving and transmitting beam codebooks between respective codebook from the base station transmitting beam codebook set and respective codebook from the corresponding terminal receiving beam codebook set to the terminal 12, and the terminal 12 receives and caches them.

The base station 11 obtains location information of the terminal 12, determines a grid where the terminal is located from the preset grid based on the location information of the terminal 12, determines a target transmitting beam codebook based on the grid where the terminal is located and the base station transmitting beam codebook set corresponding to the preset grid, and transmits information of the target transmitting beam codebook to the terminal 12: the terminal 12 determines a corresponding target receiving beam codebook from a terminal receiving beam codebook set corresponding to the preset grid according to the information of the target transmitting beam codebook; and the base station 11 sends a signal to the terminal by using the target transmitting beam codebook, and the terminal 12 receives the signal by using the target receiving beam codebook.

The base station involved in the embodiments of the present disclosure may also be other network devices, and the base station may include cells providing services for a terminal. Depending on the specific application scenario, the base station may also be called as an access point, a device in the access network that communicates with a wireless terminal device through one or more sectors on the air interface, or other names. The base station may be configured to exchange a received air frame with an Internet protocol (Internet protocol, IP) packet, worked as a router between the wireless terminal device and the rest of the access network, where the rest of the access network may include an Internet protocol (Internet protocol, IP) communication network. The network device may further coordinate an attribute management of an air interface. The base station involved in the embodiments of the present disclosure is a base station in a near-field communication scenario, such as, a base station in the 6G network (6th generation mobile networks) architecture, and may also be a base station that applies the ultra large scale antenna, the holographic MIMO (Multiple Input Multiple Output, multiple input multiple output), or other holographic radio technologies. The base station may also be a home evolved Node B (Home evolved Node B, HeNB), a relay node (relay node), a femto (femto), a pico (pico), etc. in the near-field communication scenario, which are not limited in the embodiments of the present disclosure.

The terminal device involved in the embodiments of the present disclosure may be a device that provides voice and/or data connectivity to a user, a handheld device with wireless connection functions, or other processing device connected to a wireless modem. In different systems, the names of the terminal device may also be different. For example, in a 5G system, the terminal device may be called as a user equipment (User Equipment, UE). The wireless terminal device may communicate with one or more core networks (Core Network, CN) through a radio access network (Radio Access Network, RAN). The wireless terminal device may be a mobile terminal device, such as a mobile phone (or a "cellular" phone) and a computer with a mobile terminal device. For example, it may be a portable, pocket, handheld, computer-built or vehicle-mounted mobile apparatus, which exchanges voice and/or data with the wireless access network. For example, a personal communication service (Personal Communication Service, PCS) telephone, a cordless telephone, a session initiation protocol (Session Initiated Protocol, SIP) telephone, a wireless local loop (Wireless Local Loop, WLL) station, a personal digital assistant (Personal Digital Assistant, PDA) and other devices. The wireless terminal device may also be referred to as a system, a subscriber unit (subscriber unit), a subscriber station (subscriber station), a mobile station (mobile station), a mobile (mobile), a remote station (remote station), an access point (access point), a remote terminal (remote terminal), an access terminal (access terminal), a user terminal (user terminal), a user agent (user agent), a user device (user device), which is not limited in the embodiments of the present disclosure.

The following will provide a clear and complete description of the embodiments of the present disclosure with reference to the accompanying drawings. Apparently, the described embodiments are only a part of the embodiments of the present disclosure, but not all embodiments.

Hereinafter, the method and apparatus are based on the same application concept. Due to the similarity in the principle of problem-solving between the method and the apparatus, the implementation of the apparatus and the method can be referred to each other, and the repetition will not be repeated.

Figure 2:
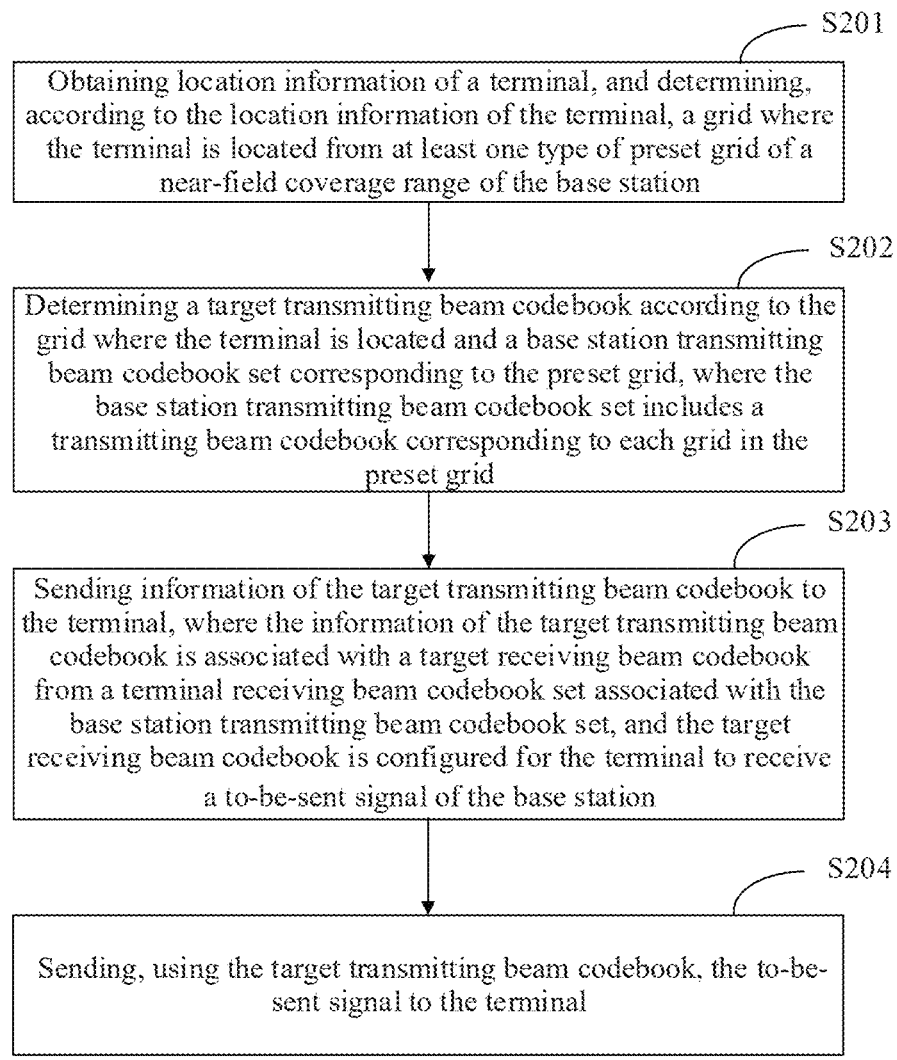
FIG. 2 is a flowchart of a near-field beam search method according to an embodiment of the present disclosure.

FIG. 2 is a flowchart of a near-field beam search method according to this embodiment. As shown in FIG. 2, this embodiment provides a near-field beam search method, with an executing subject being a base station. The specific steps of the method are as follows.

S201, obtaining location information of a terminal, and determining, according to the location information of the terminal, a grid where the terminal is located from at least one type of preset grid of a near-field coverage range of the base station.

In this embodiment, the base station divides the near-field coverage area of the base station into at least one type of preset grid in advance, and configures a transmitting beam codebook for each grid in the preset grid to form a base station transmitting beam codebook set, and configures a receiving beam codebook for each grid in the preset grid to form a terminal receiving beam codebook set. That is to say, each grid in the preset grid of the near-field coverage area of the base station is correspondingly configured with a base station transmitting beam codebook and a terminal receiving beam codebook, base station transmitting beam codebooks of different grids are different, and terminal receiving beam codebooks of different grids may be the same or different. Therefore, in a case where it is necessary to determine a transmitting beam codebook when the base station sends a signal to a certain terminal and a receiving beam codebook when the terminal receives the signal, it is necessary to obtain the location information of the terminal first, and determine a grid where the terminal is located in the preset grid according to the location information of the terminal.

In one embodiment, the location information of the terminal may be any of the following: precise location information: rough location information, such as, a relatively large range where the terminal is located: a number representing location information, such as, a grid number in a preset grid division agreed upon by the base station and terminal, as well as a region number within a grid that determines which central region or edge region of the grid the terminal is located in.

In one embodiment, the location information of the terminal may be obtained according to a high-precision positioning algorithm of the mobile communication network. The specific high-precision positioning algorithm is not limited in this embodiment.

S202, determining a target transmitting beam codebook according to the grid where the terminal is located and a base station transmitting beam codebook set corresponding to the preset grid, where the base station transmitting beam codebook set includes a transmitting beam codebook corresponding to each grid in the preset grid.

In this embodiment, after the grid where the terminal is located in the preset grid is determined, the target transmitting beam codebook for sending a signal to the terminal can be determined from the base station transmitting beam codebook set corresponding to the preset grid according to the grid where the terminal is located. The target transmitting beam codebook is a transmitting beam codebook corresponding to the grid where the terminal is located and is from the base station transmitting beam codebook set.

S203, sending information of the target transmitting beam codebook to the terminal, where the information of the target transmitting beam codebook is associated with a target receiving beam codebook from a terminal receiving beam codebook set associated with the base station transmitting beam codebook set, and the target receiving beam codebook is configured for the terminal to receive a to-be-sent signal of the base station.

In this embodiment, since the terminal receiving beam codebook set is a collection of receiving beam codebooks on the terminal side, the terminal receiving beam codebook set is broadcast to the terminal by the base station in advance and stored by the terminal. In addition, a preset mapping relationship between receiving and transmitting beam codebooks is determined according to a correspondence between respective codebook from the base station transmitting beam codebook set and respective codebook from the corresponding terminal receiving beam codebook set, and the preset mapping relationship between receiving and transmitting beam codebooks is also broadcast to the terminal.

After the grid where the terminal is located in the preset grid is determined, the base station only needs to determine the target transmitting beam codebook, and when there is only one type of preset grid, only the information of the target transmitting beam codebook needs to be sent to the terminal without sending other data. The information of the target transmitting beam codebook is associated with a target receiving beam codebook from a terminal receiving beam codebook set associated with the base station transmitting beam codebook set. In this way, the terminal can determine the corresponding target receiving beam codebook from the terminal receiving beam codebook set according to the information of the target transmitting beam codebook.

When there are types of preset grids and each preset grid is configured with a set of base station transmitting beam codebook set and a corresponding terminal receiving beam codebook set, the base station only needs to send information of the base station transmitting beam codebook set and information of the target transmitting beam codebook to the terminal, without sending other data. The information of the base station beam codebook set is associated with a terminal receiving beam codebook set, and the information of the target transmitting beam codebook is associated with a target receiving beam codebook included in a terminal receiving beam codebook set associated with the base station transmitting beam codebook set. The terminal can determine the terminal receiving beam codebook set associated with the base station transmitting beam codebook set according to the information of the base station transmitting beam codebook set, and determine the corresponding receiving beam codebook from the terminal receiving beam codebook set according to the information of the target transmitting beam codebook.

In one embodiment, the information of the base station transmitting beam codebook set may include a first identifier corresponding to the base station transmitting beam codebook set, and the information of the target transmitting beam codebook may include a second identifier corresponding to the target transmitting beam codebook. The first identifier and the second identifier may be represented by a string with a preset number of bits, where a part of bits represents the first identifier and the other bits represent the second identifier, to reduce the amount of data transmitted. The first identifier associates the base station transmitting beam codebook set with the corresponding terminal receiving beam codebook set. That is to say, the first identifier may be an identifier of the base station transmitting beam codebook set, and also be associated with the terminal receiving beam codebook set associated with the base station transmitting beam codebook set. The terminal can determine the terminal receiving beam codebook set associated with the base station transmitting beam codebook set through the first identifier. The second identifier is used to associate respective transmitting beam codebook from the base station transmitting beam codebook set with respective receiving beam codebook from the corresponding terminal receiving beam codebook set through a preset mapping relationship between receiving and transmitting beam codebooks. The preset mapping relationship between receiving and transmitting beam codebooks is a mapping relationship between an identifier of a transmitting beam codebook and an identifier of a receiving beam codebook. That is, by using the second identifier of the target transmitting beam codebook and the preset mapping relationship between receiving and transmitting beam codebooks, the target terminal receiving beam codebook corresponding to the target transmitting beam codebook can be determined. Furthermore, based on the received first identifier and the second identifier, the terminal can more conveniently and accurately search for the terminal receiving beam codebook set associated with the base station transmitting beam codebook set according to the first identifier, and search for the target terminal receiving beam codebook corresponding to the target transmitting beam codebook from the terminal receiving beam codebook set according to the second identifier and the preset mapping relationship between receiving and transmitting beam codebooks.

S204, sending, using the target transmitting beam codebook, the to-be-sent signal to the terminal.

In this embodiment, after the base station determines the target transmitting beam codebook and the terminal determines the receiving beam codebook, the base station may send the to-be-sent signal to the terminal by using the target transmitting beam codebook, and then the terminal may receive the to-be-sent signal by using the target receiving beam codebook, to achieve accurate signal transmission from the base station to the terminal.

In the near-field beam search method provided in this embodiment, the base station obtains location information of a terminal, and determines, according to the location information of the terminal, a grid where the terminal is located from a preset grid of a near-field coverage range of the base station: the base station determines a target transmitting beam codebook according to the grid where the terminal is located and a base station transmitting beam codebook set corresponding to the preset grid, where the base station transmitting beam codebook set includes a transmitting beam codebook corresponding to each grid in the preset grid: the base station sends information of the target transmitting beam codebook to the terminal, where the information of the target transmitting beam codebook is associated with a target receiving beam codebook from a terminal receiving beam codebook set associated with the base station transmitting beam codebook set, and the target receiving beam codebook is configured for the terminal to receive a to-be-sent signal of the base station; the terminal determines, according to the information of the target transmitting beam codebook, a corresponding target receiving beam codebook from a terminal receiving beam codebook set corresponding to the preset grid; and the base station sends, using the target transmitting beam codebook, the to-be-sent signal to the terminal, and the terminal receives, using the target receiving beam codebook, the to-be-sent signal. By dividing the near-field coverage range of the base station into the preset grid and configuring the base station transmitting beam codebook set and terminal receiving beam codebook set accordingly, the target transmitting beam codebook and the target receiving beam codebook used for signal transmission between the base station and the terminal can be quickly and accurately determined based on the location of the terminal in the preset grid, to reduce the time overhead and complexity of beam search, and improving the accuracy of beam search.

Figure 3:
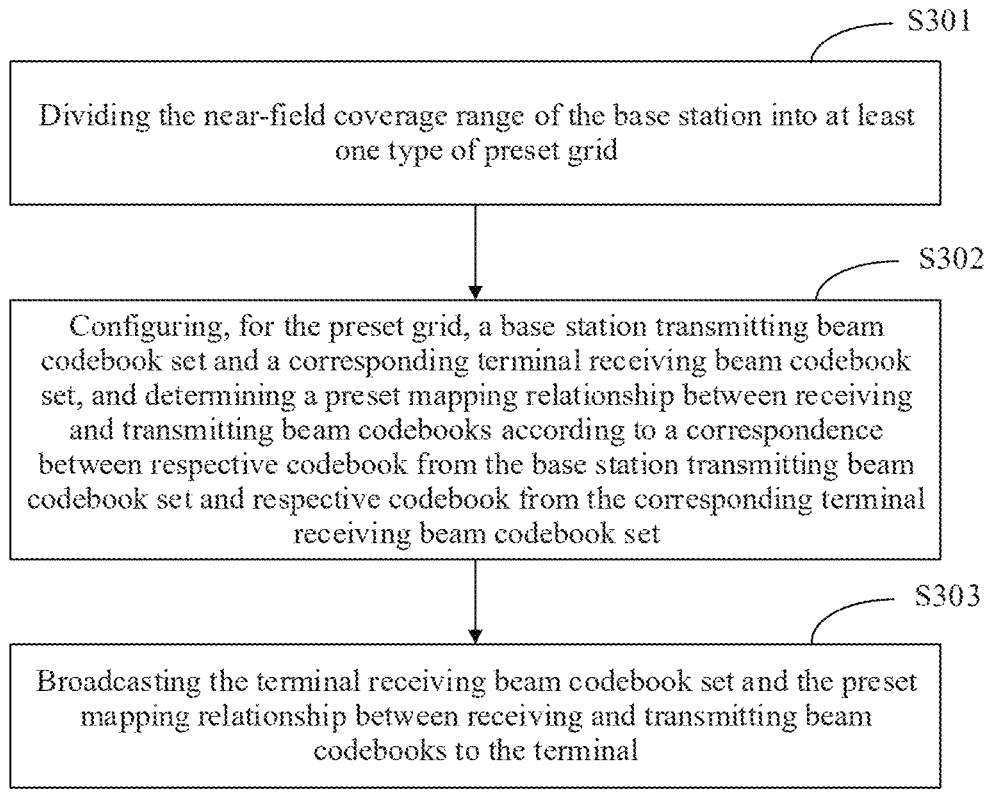
FIG. 3 is a flowchart of a near-field beam search method according to another embodiment of the present disclosure.

On the basis of any of the above embodiments, as shown in FIG. 3, the specific process of dividing the preset grid and configuring the codebook set may be as follows.

S301, dividing the near-field coverage range of the base station into at least one type of preset grid.

S302, configuring, for the preset grid, a base station transmitting beam codebook set and a corresponding terminal receiving beam codebook set, and determining a preset mapping relationship between receiving and transmitting beam codebooks according to a correspondence between respective codebook from the base station transmitting beam codebook set and respective codebook from the corresponding terminal receiving beam codebook set.

S303, broadcasting the terminal receiving beam codebook set and the preset mapping relationship between receiving and transmitting beam codebooks to the terminal.

In this embodiment, the at least one type of preset grid is divided for the near-field coverage area of the base station in advance. In one embodiment, the preset grid may be divided for the near-field coverage area of the base station in a rectangular coordinate system, in a polar coordinate system, or other coordinate system.

After the preset grid is obtained, a transmitting beam codebook and a corresponding receiving beam codebook may be configured for each grid in the preset grid. In the process of dividing the preset grid and configuring the transmitting beam codebook and the corresponding receiving beam codebook for each grid in the preset grid, it is necessary for beam focusing corresponding to a codebook configured for any grid to cover the grid. The transmitting beam codebook of respective grid constitutes the base station transmitting beam codebook set, and the receiving beam codebook of respective grid constitutes the terminal receiving beam codebook set.

There is a correspondence between respective codebook from the base station transmitting beam codebook set and respective codebook from the corresponding terminal receiving beam codebook set. The correspondence may be recorded as a preset mapping relationship between receiving and transmitting beam codebooks, and after the target transmitting beam codebook is determined, the corresponding target receiving beam codebook can be determined according to the preset mapping relationship between receiving and transmitting beam codebooks. In one embodiment, considering that the resolution of the beam for the terminal is lower than that for the base station, there may not be enough receiving beam codebooks. Therefore, the preset mapping relationship between receiving and transmitting beam codebooks includes: one transmitting beam codebook corresponding to one receiving beam codebook, and/or, transmitting beam codebooks corresponding to one receiving beam codebook, to allow for flexible implementation of different codebook configurations.

Furthermore, the terminal receiving beam codebook set and the preset mapping relationship between receiving and transmitting beam codebooks may be broadcast to the terminal, and the terminal can quickly determine the target receiving beam codebook when the terminal needs to receive a signal from the base station during an application process, and it is unnecessary to transmit the receiving beam codebook set again, to reduce the latency. In one embodiment, the base station may broadcast the terminal receiving beam codebook set and the preset mapping relationship between receiving and transmitting beam codebooks to the terminal in a form of RRC (Radio Resource Control, radio resource control) signaling.

On the basis of the above embodiments, when the transmitting beam codebook set and the receiving beam codebook set are configured for each grid, if the terminal is located in an edge region of each grid, the receiving power of the terminal will decrease. Therefore, in order to avoid performance degradation at the edge of the grid, different types of preset grids are configured in this embodiment. Each type of preset grid is obtained by dividing the near-field coverage range of the base station in a different way, and at least one edge region of each type of the preset grid can be located in a central region of another type or more than one types of preset grids, and each type of preset grid is configured with a base station transmitting beam codebook set and a terminal receiving beam codebook set correspondingly. In this way, by selecting an appropriate preset grid, it is possible to prevent the terminal from being located at the edge region of the grid, to avoid the decrease in receiving power.

It should be noted that in this embodiment, boundaries of a central region and an edge region of a grid may be set in advance, that is, a boundary of the central region and a boundary of edge region of a grid may be defined in advance. The edge region can also be further subdivided by a boundary of an edge region around a grid side and a boundary of an edge region around a grid vertex. In one embodiment, in the process of setting boundaries for the central region and the edge region of a grid, it can be divided according to a beam intensity: The beam intensity in a central region of a grid is the strongest, and it gradually weakens towards the edge. A preset intensity threshold can be used as a reference for dividing boundaries.

In one embodiment, the near-field coverage range of the base station is divided into one or more type of preset grid. In one embodiment, the preset grid includes an initial grid and at least one shifted grid, and each preset grid corresponds to one type of base station transmitting beam codebook set and one type of terminal receiving beam codebook set: where the shifted grid is generated by shifting the initial grid, and at least one target edge region of each grid in the initial grid is located in a central region of each grid in the shifted grid.

Figure 4:
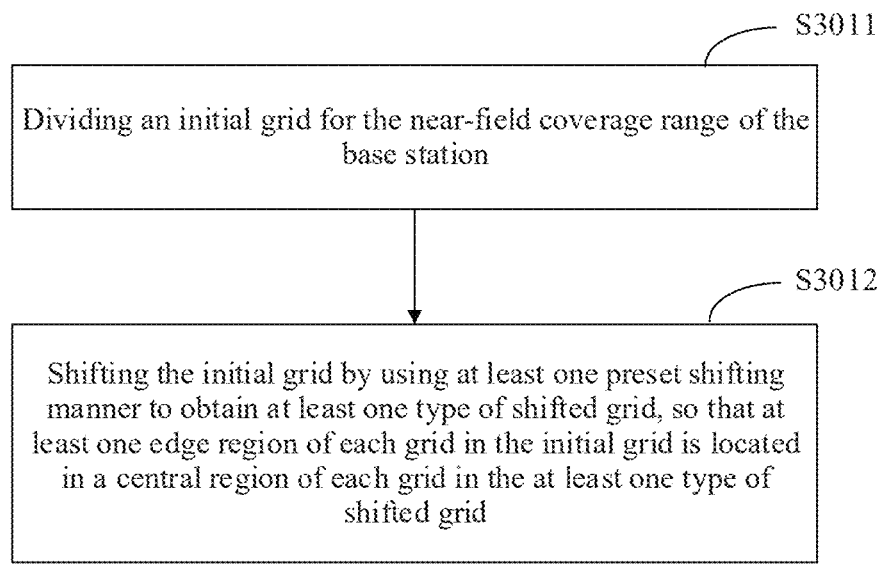
FIG. 4 is a flowchart of a near-field beam search method according to yet another embodiment of the present disclosure.

Specifically, as shown in FIG. 4, the preset grid includes an initial grid and at least one shifted grid, which can be achieved through the following process.

S3011, dividing an initial grid for the near-field coverage range of the base station.

S3012, shifting the initial grid by using at least one preset shifting manner to obtain at least one type of shifted grid, and at least one edge region of each grid in the initial grid is located in a central region of each grid in the at least one type of shifted grid.

In this embodiment, the initial grid may be a grid divided with the base station as the origin, and the grid division may be performed in a rectangular coordinate system, a polar coordinate system, or other coordinate systems.

Figure 5A:
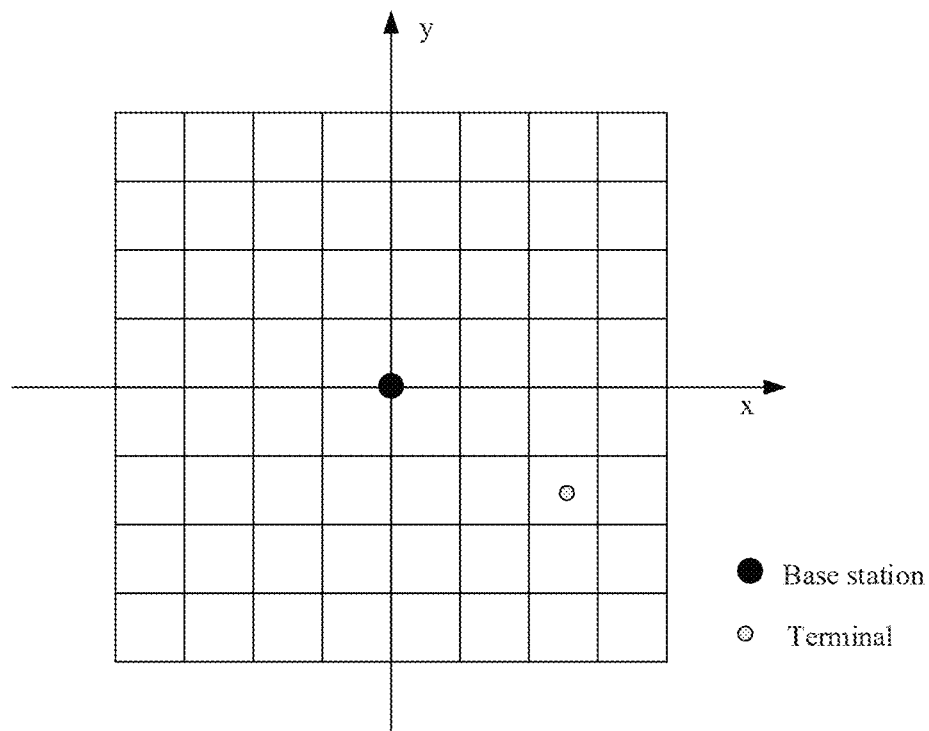
FIG. 5a is a schematic diagram of dividing an initial grid for a near-field coverage area of a base station in a rectangular coordinate system according to an embodiment of the present disclosure.

Taking the rectangular coordinate system as an example, as show in FIG. 5*a*, in the rectangular coordinate system, by taking a location of the base station as an origin, the initial grid is divided for the near-field coverage range of the base station at equal distances along an x-axis and a y-axis according to a beam focusing range.

Figure 5B:
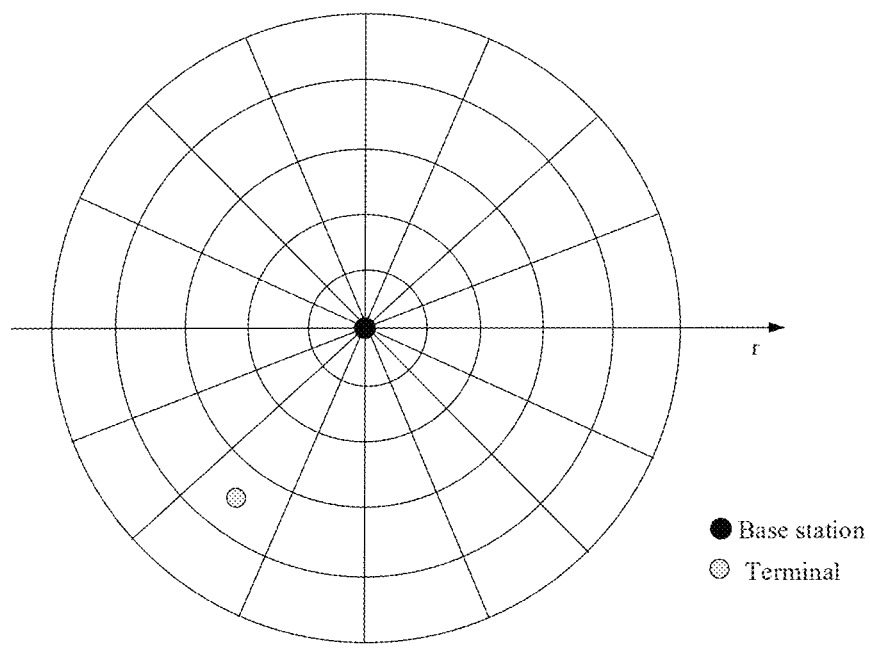
FIG. 5b is a schematic diagram of dividing an initial grid for a near-field coverage area of a base station in a polar coordinate system according to an embodiment of the present disclosure.

Taking the polar coordinate system as an example, as shown in FIG. 5*b*, in the polar coordinate system, by taking a location of the base station as a pole, the initial grid is divided for the near-field coverage range of the base station with a preset angle and a preset distance at equal intervals according to a beam focusing range.

In the process of shifting the initial grid, different shifting manners are used for the initial grid in the rectangular coordinate system and the initial grid in the polar coordinate system.

Specifically, in a rectangular coordinate system, the shifting the initial grid by using the at least one preset shifting manner to obtain the at least one type of shifted grid may specifically include:

for the initial grid in the rectangular coordinate system, shifting the initial grid along a positive direction and/or a negative direction of an x-axis to obtain the at least one type of shifted grid, and an edge region of a preset range around a side parallel to a y-axis of each grid in the initial grid is located in a central region of each grid in the shifted grid; and/or shifting the initial grid along a positive direction and/or a negative direction of a y-axis to obtain the at least one type of shifted grid, and an edge region of a preset range around a side parallel to an x-axis of each grid in the initial grid is located in a central region of each grid in the shifted grid; and/or shifting the initial grid along at least one direction at a preset angle to an x-axis to obtain a shifted grid, and an edge region of a preset range around a vertex of each grid in the initial grid is located in a central region of each grid in the shifted grid.

In this embodiment, since each grid in the initial grid in the rectangular coordinate system is rectangular, including four sides and four vertices, a preset range around the four sides and the four vertices is the edge region of the grid, where in the four sides, two sides are parallel to the x-axis, and two sides are parallel to the y-axis.

In order to make the edge region of the preset range around the side parallel to the y-axis of each grid in the initial grid be located in the central region of each grid in the shifted grid, the first shifting manner mentioned above may be used to shift the initial grid along the positive direction and/or the negative direction of the x-axis. The shift distance is set to make the edge region of the preset range around the side parallel to the y-axis of each grid be located in the central region of each grid in the shifted grid. In one embodiment, a type of shifted grid may be obtained by shifting along the positive direction of the x-axis, or a type of shifted grid may be obtained by shifting along the negative direction of the x-axis, or two types of shifted grids may be obtained by shifting along both of the positive direction and the negative direction of the x-axis respectively.

Similarly, in order to make the edge region of the preset range around the side parallel to the x-axis of each grid in the initial grid be located in the central region of each grid in the shifted grid, the second shifting method mentioned above may be used to shift the initial grid along the positive direction and/or the negative direction of the y-axis. The shift distance is set to make the edge region of the preset range around the side parallel to the x-axis of each grid be located in the central region of each grid in the shifted grid. In one embodiment, a type of shifted grid may be obtained by shifting along the positive direction of the y-axis, or a type of shifted grid may be obtained by shifting along the negative direction of the y-axis, or two types of shifted grids may be obtained by shifting along both of the positive direction and the negative direction of the y-axis respectively.

Furthermore, in order to make the edge region of the preset range around the vertex of each grid in the initial grid be located in the central region of each grid in the shifted grid, the initial grid may be shifted along at least one direction at a preset angle to the x-axis. The preset angle and the shift distance are set to make the edge region of the preset range around the vertex of each grid in the initial grid be located in the central region of each grid in the shifted grid. In one embodiment, each grid in the initial grid is rectangular, and the preset angle may be along a diagonal direction. For example, each grid in the initial grid is square, and the preset angle may be at least one angle of 45°, 135°, 225°, or 315° to the positive direction of the x-axis. In one embodiment, at least one type of shifted grid can be obtained by shifting using at least one preset angle.

By shifting the initial grid in the rectangular coordinate system by using the above at least one preset shifting manner, it is possible to shift at least one edge region of each grid in the initial grid to the central region of each grid in the at least one type of shifted grid, ensuring that the edge regions of the initial grid and respective shifted grid can complement each other and be fully covered by the beam.

In the polar coordinate system, the shifting the initial grid by using the at least one preset shifting manner to obtain the at least one type of shifting grid may specifically include:

for the initial grid in the polar coordinate system, enlarging and/or reducing the initial grid along a polar axis with a pole as a center to obtain the at least one type of shifted grid, and an edge region of a preset range around an arc side of each grid in the initial grid is located in a central region of each grid in the shifted grid; and/or rotating the initial grid clockwise and/or counterclockwise with a pole as a center to obtain the at least one type of shifted grid, and an edge region of a preset range around a side along a polar diameter direction of each grid in the initial grid is located in a central region of each grid in the shifted grid; and/or enlarging and/or reducing the initial grid along a polar axis with a pole as a center, and rotating the initial grid clockwise and/or counterclockwise with the pole as a center, to obtain the at least one type of shifted grid, and an edge region of a preset range around a vertex of each grid in the initial grid is located in a central region of each grid in the shifted grid.

In this embodiment, since each grid of the initial grid in the polar coordinate system is a fan ring, including two arc sides, two sides along the polar diameter directions and four vertices, a preset range around the four sides and the four vertices is the edge region of the grid.

In order to make the edge region of the preset range around the arc side of each grid in the initial grid be located in the central region of each grid in the shifted grid, the first shifting manner mentioned above may be used to enlarge and/or reduce the initial grid along the polar axis with the pole as the center. By enlarging and/or reducing each grid of the initial grid, the shifting is performed (no longer located at the original position thereof). The magnification of the enlarging and/or the reducing is set to make the edge region of the preset range around the arc side of each grid be located in the central region of each grid in the shifted grid. In one embodiment, a type of shifted grid may be obtained by enlarging, or a type of shifted grid may be obtained by reducing, or two types of shift grids may be obtained by enlarging and reducing respectively.

In order to make the edge region of the preset range around the side along the polar diameter direction of each grid in the initial grid be located in the central region of each grid in the shifted grid, the second shifting manner mentioned above may be used to rotate the initial grid clockwise and/or counterclockwise with the pole as the center to obtain the at least one type of shifted grid. The rotation angle is set to make the edge region of the preset range around the side along the polar diameter direction of each grid in the initial grid be located in the central region of each grid in the shifted grid. In one embodiment, a type of shifted grid may be obtained by rotating clockwise, or a type of shifted grid may be obtained by rotating counterclockwise, or two types of shifted grids may be obtained by rotating clockwise and counterclockwise respectively.

In order to make the edge region of the preset range around the vertex of each grid in the initial grid be located in the central region of each grid in the shifted grid, the third shifting manner mentioned above may be used to enlarge and/or reduce the initial grid along the polar axis with the pole as the center, and rotate the initial grid clockwise and/or counterclockwise with the pole as the center. The magnification of the enlarging and/or the reducing and the rotation angle are set to make the edge region of the preset range around the vertex of each grid in the initial grid be located in the central region of each grid in the shifted grid. The order of scaling and rotating is not limited in this embodiment. In one embodiment, the at least one type of shifted grid may be obtained by combining the magnification of the enlarging and/or the reducing with the rotation angle.

By shifting the initial grid in the polar coordinate system by using the above at least one preset shifting manner, it is possible to shift at least one edge region of each grid in the initial grid to the central region of each grid in the at least one type of shifted grid, ensuring that the edge regions of the initial grid and respective shifted grid can complement each other and be fully covered by the beam.

On the basis that the preset grid includes an initial grid and at least one shifted grid, and each preset grid corresponds to one type of base station transmitting beam codebook set and one type of terminal receiving beam codebook set, S202 may specifically include:

if it is determined that the terminal is located in a central region of any first grid in the initial grid, determining, from a base station transmitting beam codebook set corresponding to the initial grid, a transmitting beam codebook corresponding to the first grid as the target transmitting beam codebook: or if it is determined that the terminal is located in an edge region of any first grid in the initial grid, and it is determined that the terminal is located in a central region of any second grid in the shifted grid, determining, from a base station transmitting beam codebook set corresponding to the shifted grid, a transmitting beam codebook corresponding to the second grid as the target transmitting beam codebook.

In this embodiment, a suitable type of preset grid can be selected according to the location information of the terminal, and the terminal is located in a central region of a certain grid of the preset grid, ensuring that the terminal has sufficient receiving power.

In one embodiment, the specific logic may be that, the initial grid is taken as a reference (each grid in the initial grid is referred to as the first grid) firstly to determine whether the terminal is located in the central region or the edge region of any first grid in the initial grid. If it is determined that the terminal is located in the central region of any first grid, the base station transmitting beam codebook set corresponding to the initial grid is directly used, that is, from the base station transmitting beam codebook set corresponding to the initial grid, the transmitting beam codebook corresponding to the first grid is determined as the target transmitting beam codebook: if it is determined that the terminal is located in the edge region of any first grid, a shifted grid is selected (each grid of the shifted grid is referred to as a second grid), and in the selected shifted grid, the terminal is located in the central region of any second grid in the shifted grid, then the base station transmitting beam codebook set corresponding to the shifted grid may be used, that is, from the base station transmitting beam codebook set corresponding to the shifted grid, the transmitting beam codebook corresponding to the second grid is determined as the target transmitting beam codebook.

In some embodiments, it is also possible to take any shifted grid as a reference firstly, that is, determine whether the terminal is located in the central region or the edge region of any second grid in the shifted grid firstly. The subsequent process is similar with the above logic and will not be repeated.

Furthermore, after the target transmitting beam codebook is determined, the information of the base station transmitting beam codebook set and the information of the target transmitting beam codebook is sent to the terminal. The terminal determines a corresponding target receiving beam codebook from a terminal receiving beam codebook set corresponding to the preset grid according to the information of the target transmitting beam codebook: the base station sends a signal to the terminal by using the target transmitting beam codebook, and the terminal receives the signal by using the target receiving beam codebook. The specific process can be referred to the above embodiments and will not be repeated.

Figure 6:
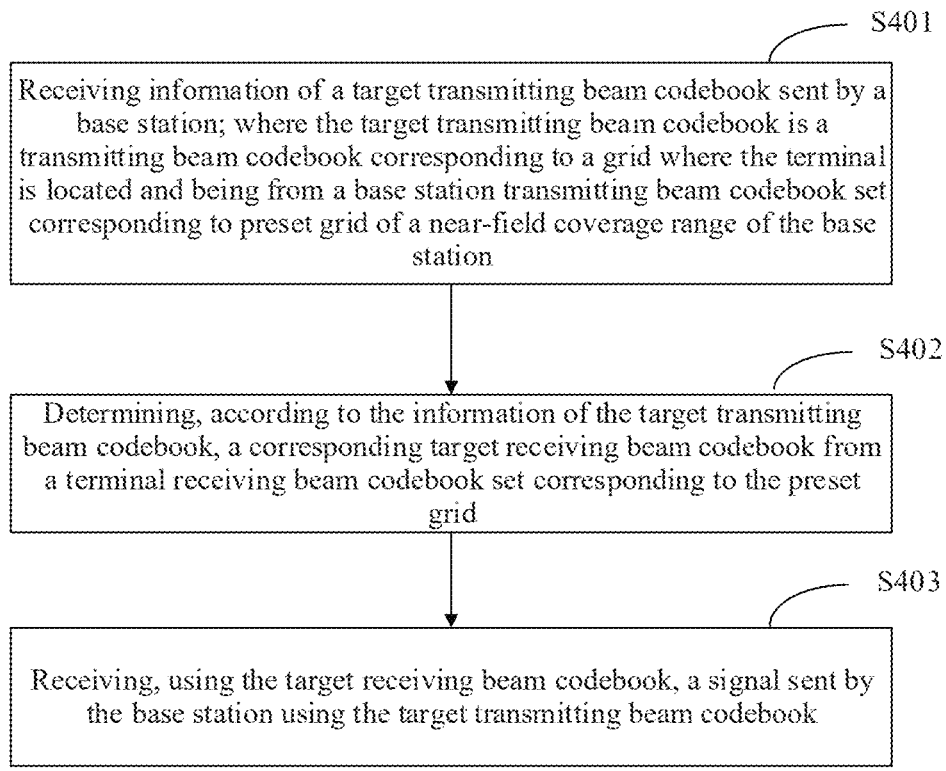
FIG. 6 is a flowchart of a near-field beam search method according to yet another embodiment of the present disclosure.

FIG. 6 is a flowchart of a near-field beam search method according to this embodiment. As shown in FIG. 6, this embodiment provides a near-field beam search method, with an executing subject being a terminal. The specific steps of the method are as follows:

S401, receiving information of a target transmitting beam codebook sent by a base station; where the target transmitting beam codebook is a transmitting beam codebook corresponding to a grid where the terminal is located and being from a base station transmitting beam codebook set corresponding to a preset grid of a near-field coverage range of the base station;

S402, determining, according to the information of the target transmitting beam codebook, a corresponding target receiving beam codebook from a terminal receiving beam codebook set corresponding to the preset grid; and S403, receiving, using the target receiving beam codebook, a signal sent by the base station using the target transmitting beam codebook.

This embodiment is the method of the terminal side in the above embodiments, and the principles and effects can be referred to the above embodiments, and will not be repeated.

Furthermore, the receiving the information of the target transmitting beam codebook sent by the base station includes:

receiving information of the base station transmitting beam codebook set and information of the target transmitting beam codebook sent by the base station; where the information of the base station transmitting beam codebook set is associated with the terminal receiving beam codebook set;

the determining, according to the information of the target transmitting beam codebook, the corresponding target receiving beam codebook from the terminal receiving beam codebook set corresponding to the preset grid includes:

determining, according to the information of the base station transmitting beam codebook set, the terminal receiving beam codebook set associated with the base station transmitting beam codebook set, and determining, according to the information of the target transmitting beam codebook, the corresponding target receiving beam codebook from the terminal receiving beam codebook set.

Furthermore, the information of the base station transmitting beam codebook set includes a first identifier corresponding to the base station transmitting beam codebook set including the target transmitting beam codebook: the information of the target transmitting beam codebook includes a second identifier corresponding to the target transmitting beam codebook; and the determining, according to the information of the target transmitting beam codebook, the corresponding target receiving beam codebook from the terminal receiving beam codebook set corresponding to the preset grid as described in S402 includes:

searching for, according to the first identifier, the terminal receiving beam codebook set associated with the base station transmitting beam codebook set, and searching for, from the terminal receiving beam codebook set according to the second identifier and a preset mapping relationship between receiving and transmitting beam codebooks, the target terminal receiving beam codebook corresponding to the target transmitting beam codebook.

Furthermore, before receiving the information of the target transmitting beam codebook sent by the base station, the method further includes:

receiving and storing the terminal receiving beam codebook set and a preset mapping relationship between receiving and transmitting beam codebooks broadcast by the base station. The received terminal receiving beam codebook set, which is the terminal receiving beam codebook set corresponding to the preset grid in S302, can provide a basis for determining the target receiving beam codebook.

In order to further introduce the near-field beam search method mentioned above, the embodiments of the present disclosure further provide the following examples for detailed illustration.

Example 1

Taking a rectangular coordinate system as an example, the following will introduce in detail the design process of grid division and configuration of the base station transmitting beam codebook set and the terminal receiving beam codebook set, as well as the use process of a beam codebook applicable for a terminal which is determined according to a location of the terminal.

I. Design Process

1. A Near-Field Coverage Area of a Base Station is Divided into an Initial Grid

By taking a location of the base station as an origin, an initial grid is divided for the near-field coverage range of the base station at equal distances along an x-axis and a y-axis according to a beam focusing range, and the grid division shown in FIG. 5a is obtained.

2. For the Edge of the Grid, the Initial Grid is Shifted to Obtain a Shifted Grid In order to avoid the terminal being located in an edge region of any grid in the initial grid, the initial grid is shifted. As shown in FIG. 7a to FIG. 7h, for extreme edge cases of four sides and four corners, the initial grid is shifted in directions of the arrows. After shifting, the initial grid becomes the grid division as shown by the dashed lines in the figures, and 8 types of shifted grids are obtained. The initial grid and the 8 types of shifted grids (a) to (h) may be numbered as 0, 1 . . . , 8, respectively, which can be represented by 3 bits.

3. Corresponding Codebook Sets are Configured According to the Divided Initial Grid And the Shifted Grid a) Designing a base station transmitting beam codebook and a terminal receiving beam codebook for each grid in the divided initial grid, and beam focusing corresponding to the designed transmitting beam codebook can cover the corresponding grid exactly, a set of transmitting beam codebooks covering respective grid constitutes the base station transmitting beam codebook set corresponding to the initial grid, and a set of receiving beam codebooks covering respective grid constitutes the terminal receiving beam codebook set corresponding to the initial grid;

assuming that the transmitting beam codebooks of the base station corresponds one-to-one to the receiving beam codebooks of the terminal;

b) using the same method as for the initial grid, configuring for the shifted grid a base station transmitting beam codebook set corresponding to the shifted grid and a terminal receiving beam codebook set corresponding to the shifted grid.
4. The base station broadcasts, through RRC signaling, the terminal receiving beam codebook sets corresponding to the numbers of the 9 base station transmitting beam codebook sets, as well as a mapping relationship (a correspondence between numbers) between respective codebook in respective base station transmitting beam codebook set and respective codebook in the corresponding terminal receiving beam codebook set to the terminal.
5. The terminal receives the terminal receiving beam codebook set and the mapping relationship broadcast by the base station.
6. The terminal stores the received terminal receiving beam codebook set and the mapping relationship.

II. Use Process
1. The base station uses a high-precision positioning algorithm to obtain location information of the terminal.
2. The base station determines a transmitting beam codebook and a receiving beam codebook applicable for the terminal based on the location information of the terminal.

Figure 8:
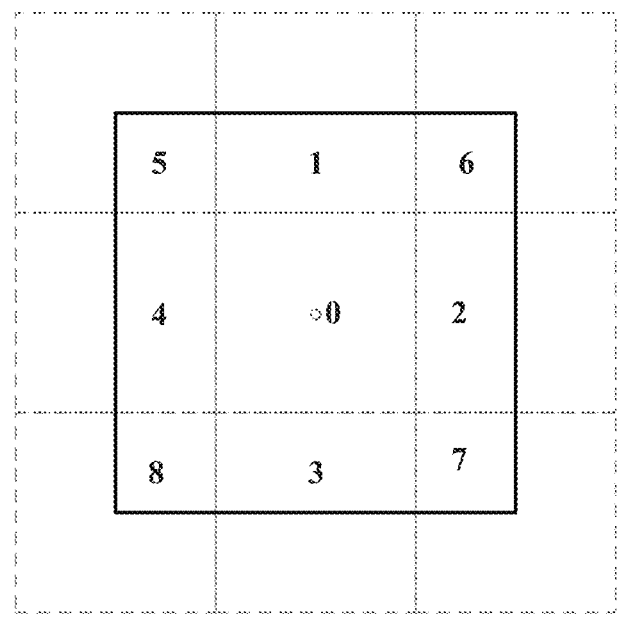
FIG. 8 is a schematic diagram of dividing a grid in an initial grid into regions according to an embodiment of the present disclosure.

As shown in FIG. 8, a grid in an initial grid is divided into regions in advance (the solid box in FIG. 8 is a grid), where 0 is a central region and 1-8 are edge regions. According to the region where the terminal is located in the initial grid, from the codebook set corresponding to the shifted grid corresponding to the region number, a transmitting beam codebook and a receiving beam codebook of the corresponding grid are selected as the target transmitting beam codebook and the target receiving beam codebook of the terminal.

3. The base station indicates to the terminal the target receiving beam codebook corresponding to the selected target transmitting beam codebook.

As disclosed in the above design process, there are a total of 9 codebook sets, and assuming that each codebook set is divided with 256 grids numbered 0-255, 3 bits are required to represent a codebook set number, and 8 bits are required to represent a codebook number corresponding to a grid. If a region 3 where the terminal is located corresponds to a 20th codebook in a corresponding codebook set, the sent indicator bits are 01100010100, where the first 3 bits of "011" represent the number of the base station transmitting beam codebook set, and the last 8 bits of "00010100" represent the number of the target transmitting beam codebook.

4. The terminal receives the base station transmitting beam codebook set and the number 01100010100 of the target transmitting beam codebook sent by the base station.
5. The terminal determines the terminal receiving beam codebook set and the target receiving beam codebook according to the received number.
6. The base station sends a signal by using the selected target transmitting beam codebook.
7. The terminal receives the signal by using the target receiving beam codebook corresponding to the target transmitting beam codebook.

Example 2

Taking a rectangular coordinate system as an example, the following will introduce in detail the design process of grid division and configuration of the base station transmitting beam codebook set and the terminal receiving beam codebook set, as well as the use process of a beam codebook applicable for a terminal which is determined according to a location of the terminal. Different from example 1, in this example, 4 codebook sets are used, that is, only 2 bits are used to represent the transmitting beam codebook set.

I. Design Process
1. A near-field coverage area of a base station is divided into an initial grid By taking a location of the base station as an origin, an initial grid is divided for the near-field coverage range of the base station at equal distances along an x-axis and a y-axis according to a beam focusing range, and the grid division shown in FIG. 5a is obtained.

Figure 7A:
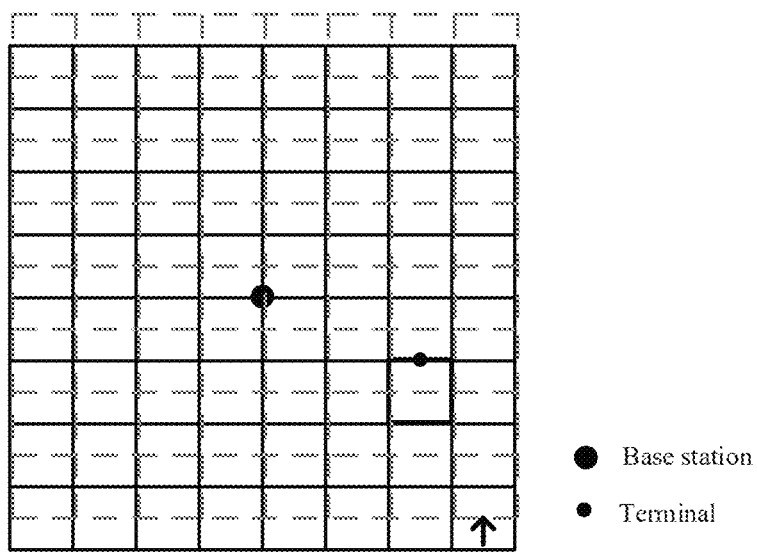
FIG. 7a to FIG. 7h are schematic diagrams of shifting an initial grid according to an embodiment of the present disclosure.
Figure 7B:
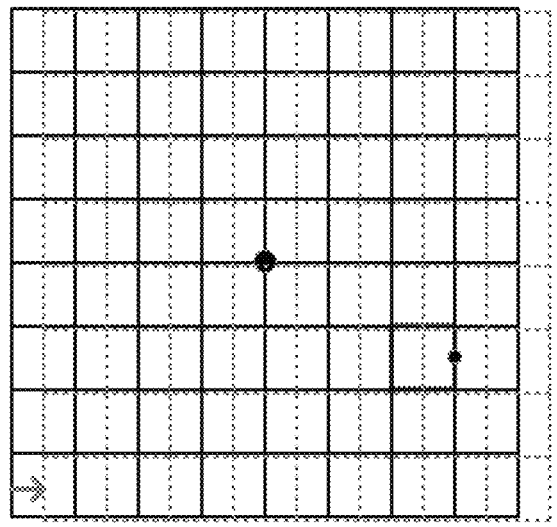
Figure 7C:
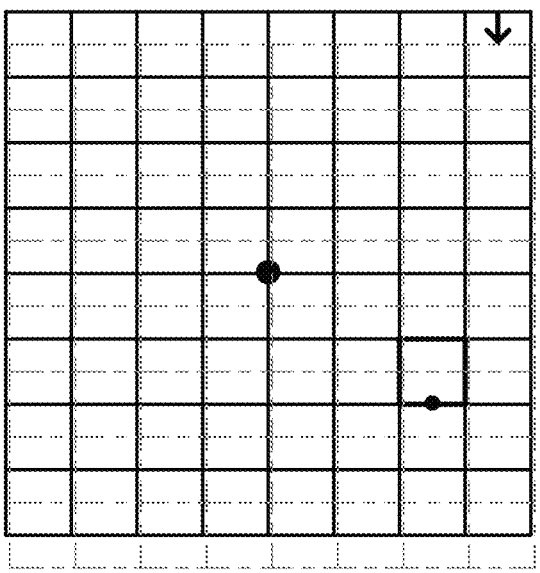
Figure 7D:
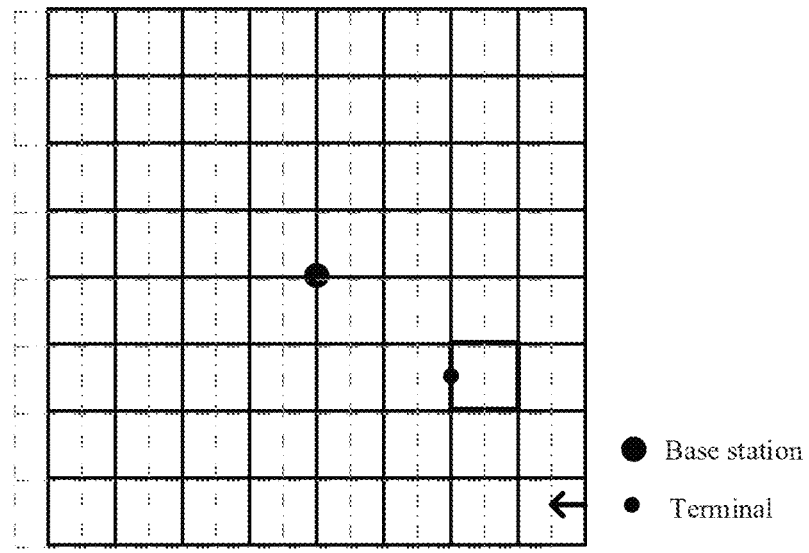
Figure 7E:
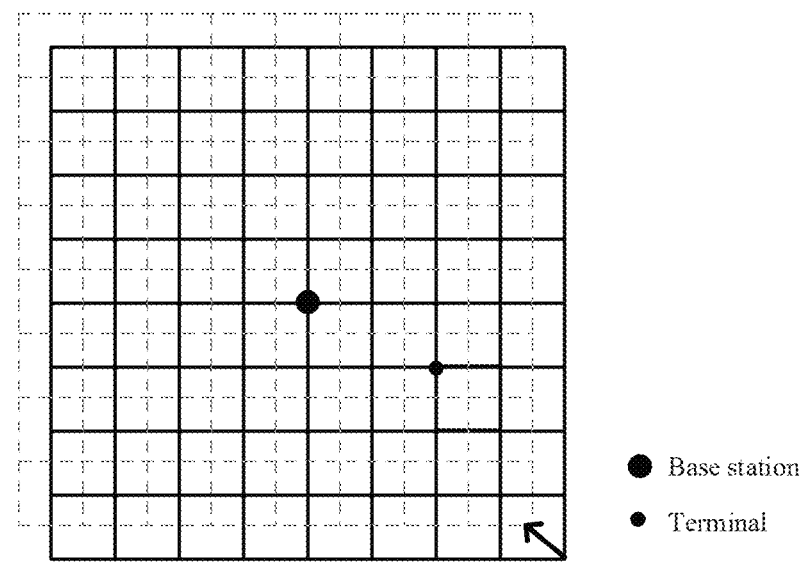
Figure 7F:
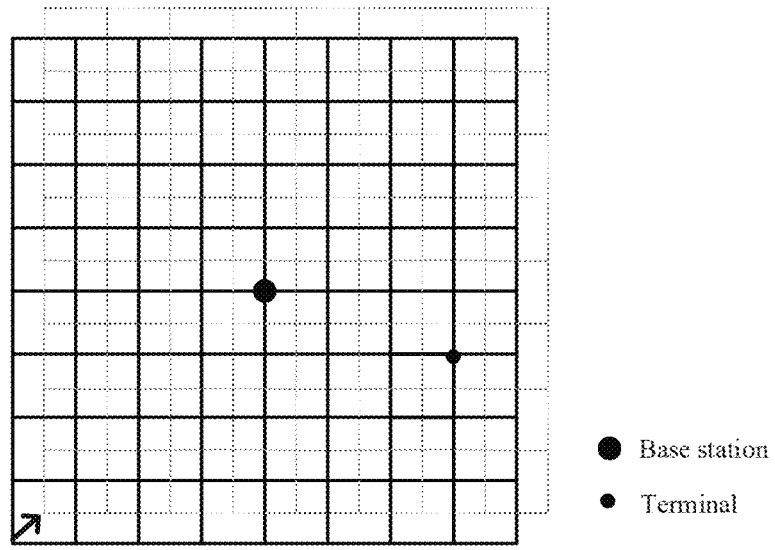
Figure 7G:
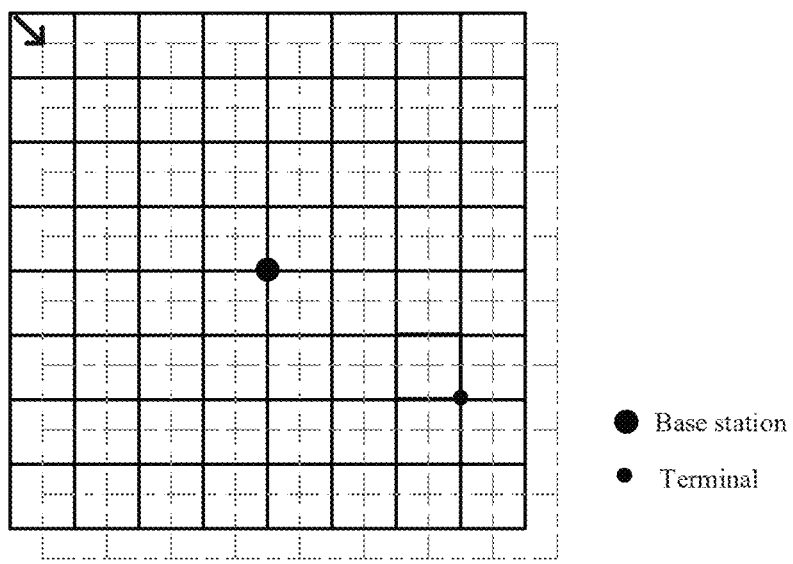
Figure 7H:
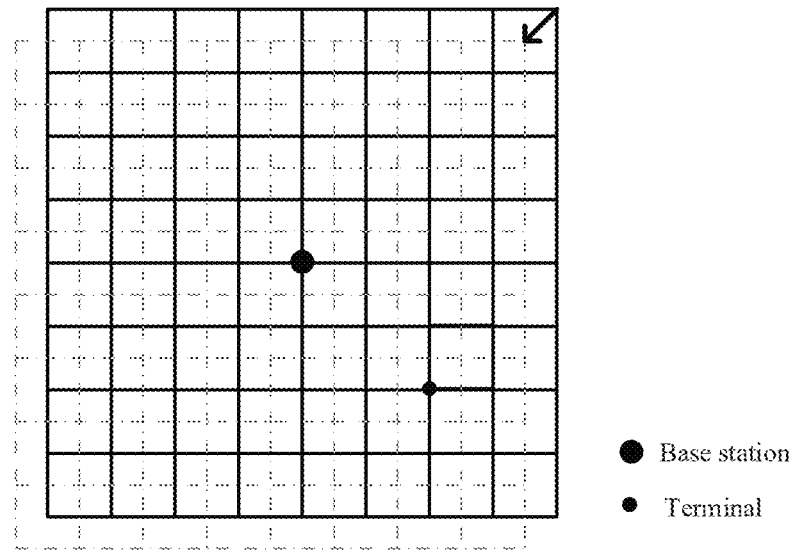
Figure 9A:
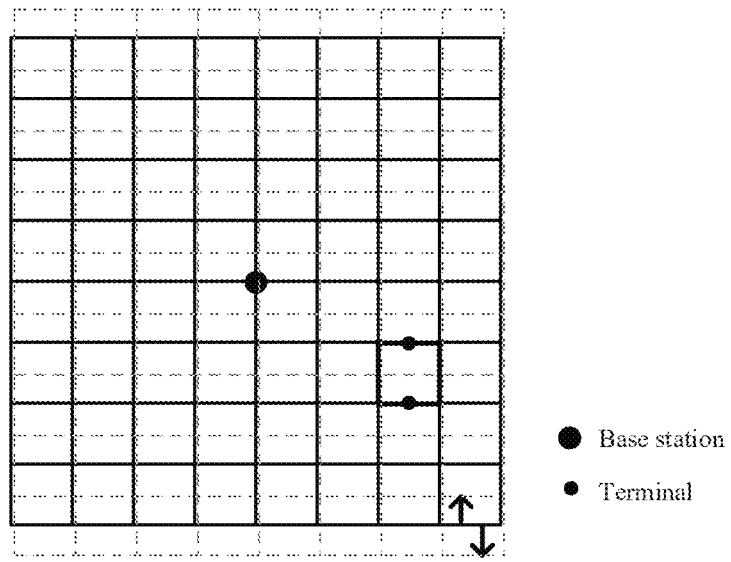
FIG. 9a to FIG. 9c are schematic diagrams of shifting an initial grid according to another embodiment of the present disclosure.
Figure 9B:
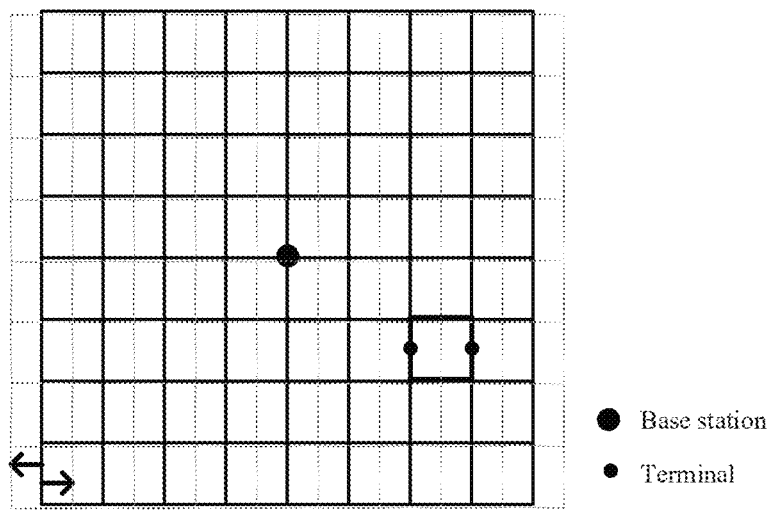
Figure 9C:
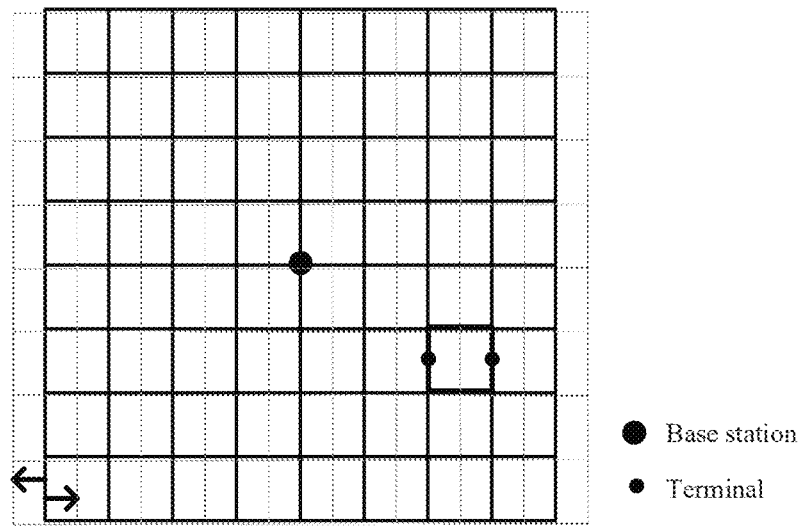

2. For the edge of the grid, the initial grid is shifted to obtain a shifted grid In order to avoid the terminal being located in an edge region of any grid in the initial grid, the initial grid is shifted. As shown in FIG. 9a to FIG. 9c (in FIG. 9a, cases shown in FIG. 7a and FIG. 7c are merged; in FIG. 9b, cases shown in FIG. 7b and FIG. 7d are merged; in FIG. 9c, cases shown in cases of FIG. 7e to FIG. 7h are merged), after shifting, the initial grid becomes the grid division as shown by the dashed lines in the figures, and 3 sets of shifted grids are obtained. The initial grid and the 3 sets of shifted grids in FIG. 9a to FIG. 9c are numbered as 0, 1, 2 and 3, respectively, which can be represented by 2 bits.

3. Corresponding codebook sets are set according to the divided initial grid and the shifted grid
   a) Designing a base station transmitting beam codebook and a terminal receiving beam codebook for each grid in the divided initial grid, and beam focusing corresponding to a designed transmitting beam codebook can cover the corresponding grid exactly, a set of transmitting beam codebooks covering respective grid constitutes the base station transmitting beam codebook set corresponding to the initial grid, and a set of receiving beam codebooks covering respective grid constitutes the terminal receiving beam codebook set corresponding to the initial grid;
   assuming that the resolution of the beam for the terminal is lower than that for the base station, that is, transmitting beam codebooks of the base station correspond to one receiving beam codebook of the terminal;
   b) using the same method as for the initial grid, configuring for the shifted grid a base station transmitting beam codebook set corresponding to the shifted grid and a terminal receiving beam codebook set corresponding to the shifted grid.
4. The base station broadcasts, through RRC signaling, the terminal receiving beam codebook sets corresponding to the numbers of the designed 3 base station transmitting beam codebook sets, as well as a mapping relationship (a correspondence between numbers) between respective codebook in respective base station transmitting beam codebook set and respective codebook in the corresponding terminal receiving beam codebook set to the terminal.
5. The terminal receives the terminal receiving beam codebook set and the mapping relationship broadcast by the base station.
6. The terminal stores the received terminal receiving beam codebook set and the mapping relationship.

II. Use Process
1. The base station uses a high-precision positioning algorithm to obtain location information of the terminal.

2. The base station determines a transmitting beam codebook and a receiving beam codebook applicable for the terminal based on the location information of the terminal.

Figure 10:
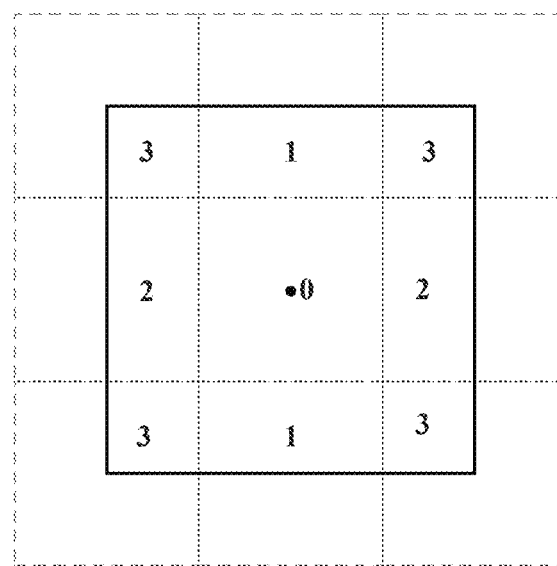
FIG. 10 is a schematic diagram of dividing a grid in an initial grid into regions according to another embodiment of the present disclosure.

As shown in FIG. 10, according to the region where the terminal is located in the initial grid, from the shifted codebook set corresponding to the shifted grid with the same number as the region, a transmitting beam codebook and a receiving beam codebook of the corresponding grid are selected as the target transmitting beam codebook and the target receiving beam codebook of the terminal.

As shown in FIG. 10, a grid in an initial grid is divided into regions in advance (the solid box in FIG. 10 is a grid), where 0 is a central region and 1-3 are edge regions. According to the region where the terminal is located in the initial grid, from the codebook set corresponding to the shifted grid corresponding to the region number, a transmitting beam codebook and a receiving beam codebook of the corresponding grid are selected as the target transmitting beam codebook and the target receiving beam codebook of the terminal.

3. The base station indicates to the terminal the target receiving beam codebook corresponding to the selected target transmitting beam codebook.

As disclosed in the above design process, there are a total of 4 codebook sets, and assuming that each codebook set is divided with 256 grids numbered 0-255, 2 bits are required to represent a codebook set number, and 8 bits are required to represent a codebook number corresponding to a grid. If a region 3 where the terminal is located corresponds to a 20th codebook in a corresponding codebook set, the sent indicator bits is 1100010100, where the first 2 bits of "11" represent the number of the base station transmitting beam codebook set, and the last 8 bits of "00010100" represent the number of the target transmitting beam codebook.

4. The terminal receives the base station transmitting beam codebook set and the number 1100010100 of the target transmitting beam codebook sent by the base station.
 5. The terminal determines the terminal receiving beam codebook set and the target receiving beam codebook according to the received number.
 6. The base station sends a signal by using the selected target transmitting beam codebook.
 7. The terminal receives the signal by using the target receiving beam codebook corresponding to the target transmitting beam codebook.

Example 3

Taking a polar coordinate system as an example, the following will introduce in detail the design process of grid division and configuration of the base station transmitting beam codebook set and the terminal receiving beam codebook set, as well as the use process of a beam codebook applicable for a terminal which is determined according to a location of the terminal.

I. Design Process
 1. A near-field coverage area of a base station is divided into an initial grid By taking a location of the base station as a pole, an initial grid is divided for the near-field coverage range of the base station with a preset angle and a preset distance at equal intervals according to a beam focusing range, and the grid division shown in FIG. 5b is obtained.

Figure 11A:
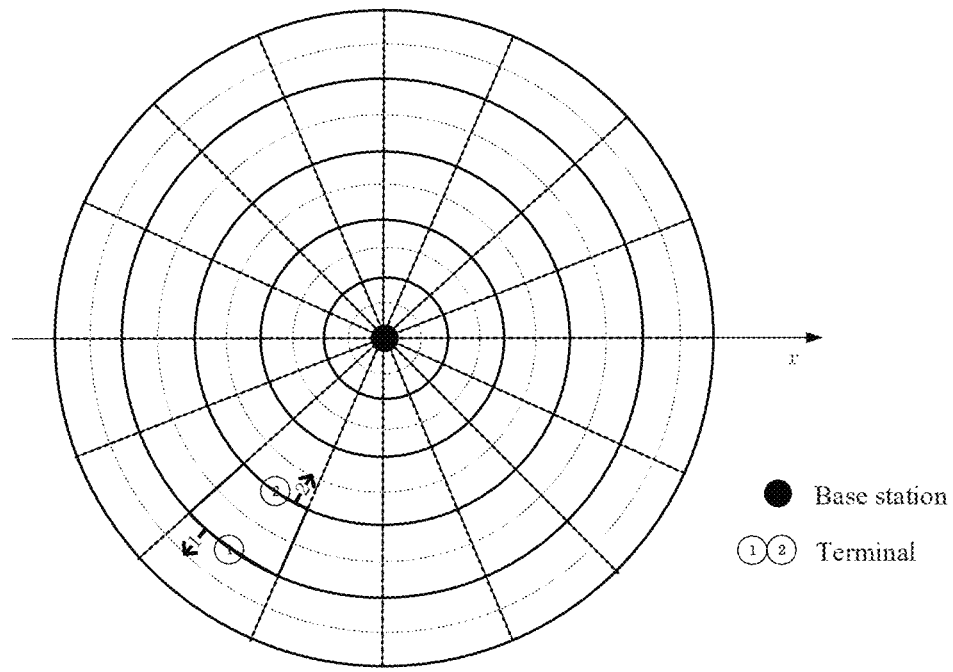
FIG. 11a to FIG. 11c are schematic diagrams of shifting an initial grid according to yet another embodiment of the present disclosure.
Figure 11B:
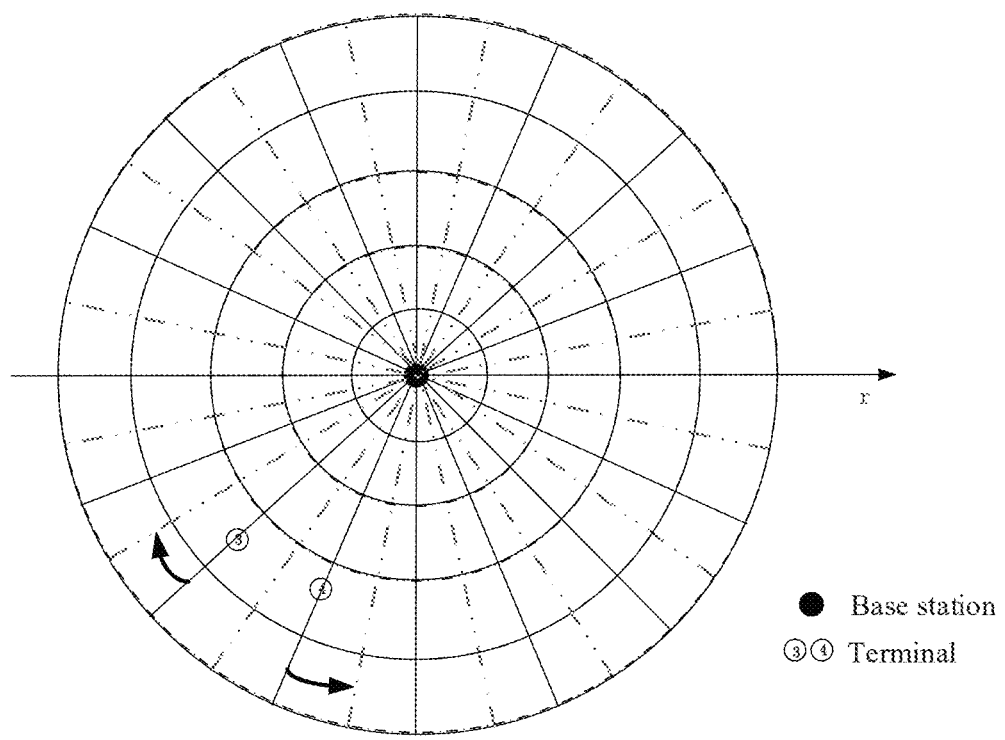
Figure 11C:
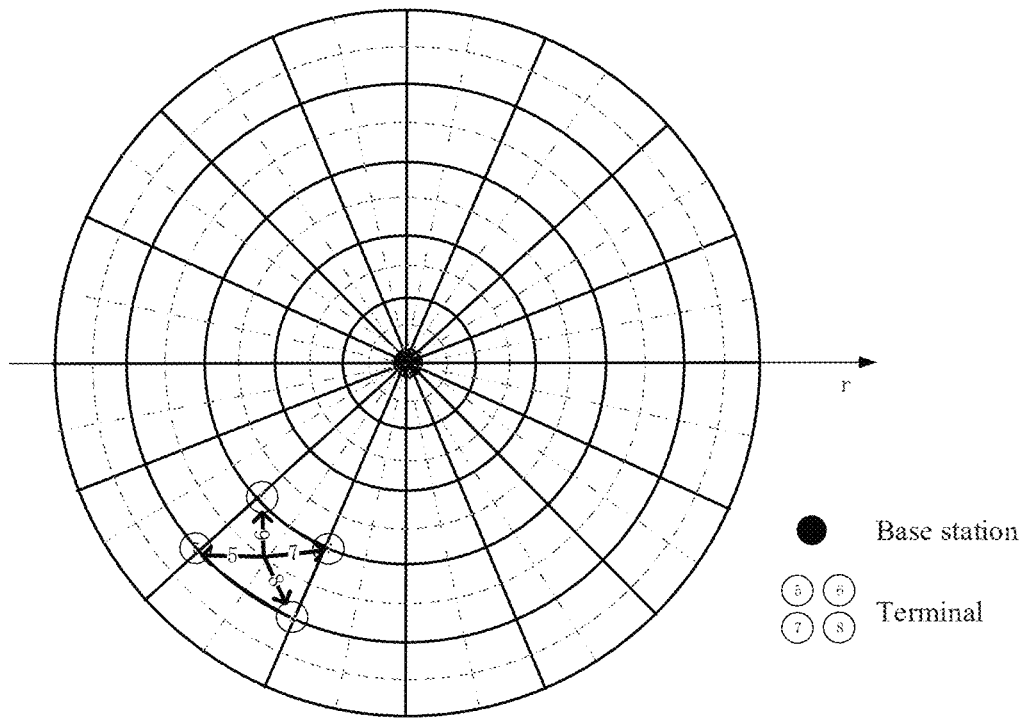

2. For the edge of the grid, the initial grid is shifted to obtain a shifted grid In order to avoid the terminal being located in an edge region of any grid in the initial grid, the initial grid is shifted. As shown in FIG. 11a to FIG. 11c, for extreme edge cases of four sides and four corners, the grid is shifted (corresponding enlarging/reducing and/or rotating in the polar coordinate system), After shifting, the initial grid becomes the grid division as shown by the dashed lines in the figures, and 3 types of shifted grids are obtained. The initial grid and the 3 types of shifted grids (a) to (c) may be numbered as 0, 1, 2, 3, respectively, which can be represented by 2 bits.

3. Corresponding codebook sets are configured according to the divided initial grid and the shifted grid
   a) Designing a base station transmitting beam codebook and a terminal receiving beam codebook for each grid in the divided initial grid, and beam focusing corresponding to the designed transmitting beam codebook can cover the corresponding grid exactly, a set of transmitting beam codebooks covering respective grid constitutes the base station transmitting beam codebook set corresponding to the initial grid, and a set of receiving beam codebooks covering respective grid constitutes the terminal receiving beam codebook set corresponding to the initial grid;
   assuming that the transmitting beam codebooks of the base station corresponds one-to-one to the receiving beam codebooks of the terminal;
   b) using the same method as for the initial grid, configuring for the shifted grid a base station transmitting beam codebook set corresponding to the shifted grid and a terminal receiving beam codebook set corresponding to the shifted grid.
 4. The terminal receiving beam codebook sets corresponding to the numbers of the 4 base station transmitting beam codebook sets, as well as a mapping relationship (a correspondence between numbers) between respective codebook in respective base station transmitting beam codebook set and respective codebook in the corresponding terminal receiving beam codebook set are broadcast to the terminal.
 5. The terminal receives the terminal receiving beam codebook set and the mapping relationship broadcast by the base station.
 6. The terminal stores the received terminal receiving beam codebook set and the mapping relationship.

II. Use Process
 1. The base station uses a high-precision positioning algorithm to obtain the location information of the terminal.
 2. The base station determines a transmitting beam codebook and a receiving beam codebook applicable for the terminal based on the location information of the terminal.

Figure 12:
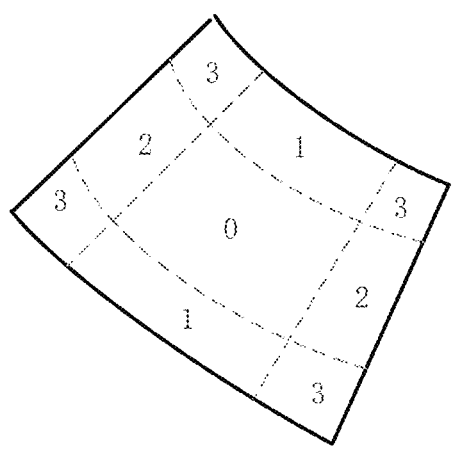
FIG. 12 is a schematic diagram of dividing a grid in an initial grid into regions according to yet another embodiment of the present disclosure.

As shown in FIG. 12, a grid in an initial grid is divided into regions in advance (the solid box in FIG. 12 is a grid), where 0 is a central region and 1-3 are edge regions. According to the region where the terminal is located in the initial grid, from the codebook set corresponding to the shifted grid corresponding to the region number, a transmitting beam codebook and a receiving beam codebook of the corresponding grid are selected as the target transmitting beam codebook and the target receiving beam codebook of the terminal.

3. The base station indicates to the terminal the target receiving beam codebook corresponding to the selected target transmitting beam codebook.

As disclosed in the above design process, there are a total of 4 codebook sets, and assuming that each codebook set is divided with 512 grids numbered 0-511, 2 bits are required to represent a codebook set number, and 9 bits are required to represent a codebook number corresponding to a grid. If the terminal is located in a 33rd codebook of a codebook corresponding to region 2, the sent indicator bits are 10000100001, where the first 2 bits of "10" represent the number of the base station transmitting beam codebook set, and the last 9 bits of "000100001" represent the number of the target transmitting beam codebook.

4. The terminal receives the base station transmitting beam codebook set and the number 10000100001 of the target transmitting beam codebook sent by the base station.
5. The terminal determines the terminal receiving beam codebook set and the target receiving beam codebook according to the received number.
6. The base station sends a signal by using the selected target transmitting beam codebook.
7. The terminal receives the signal by using the target receiving beam codebook corresponding to the target transmitting beam codebook.

Example 4

Figure 13:
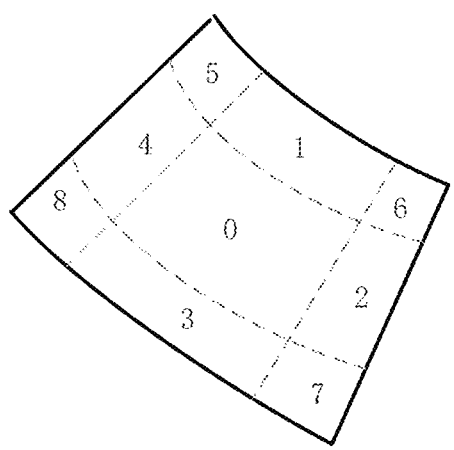
FIG. 13 is a schematic diagram of dividing a grid in an initial grid into regions according to yet another embodiment of the present disclosure.

Taking a polar coordinate system as an example, the following will introduce the design process of grid division and configuration of the base station transmitting beam codebook set and the terminal receiving beam codebook set, as well as the use process of a beam codebook applicable for a terminal which is determined according to a location of the terminal. Different from example 3, in example 4, a codebook set design similar to that in the rectangular coordinate system in example 1 may be used, that is, 9 codebook sets are used. As shown in FIG. 13, a grid in an initial grid is divided into regions (the solid box in FIG. 13 is a grid), where 0 is a central region and 1-8 are edge regions. Each of the edge regions 1-8 corresponds to one set of codebook set, then the indicator bits of the codebook set is increased by 1 bit. As for determining the codebook used according to the region of the terminal, it is similar to the division in the rectangular coordinate system in example 1.

Figure 14:
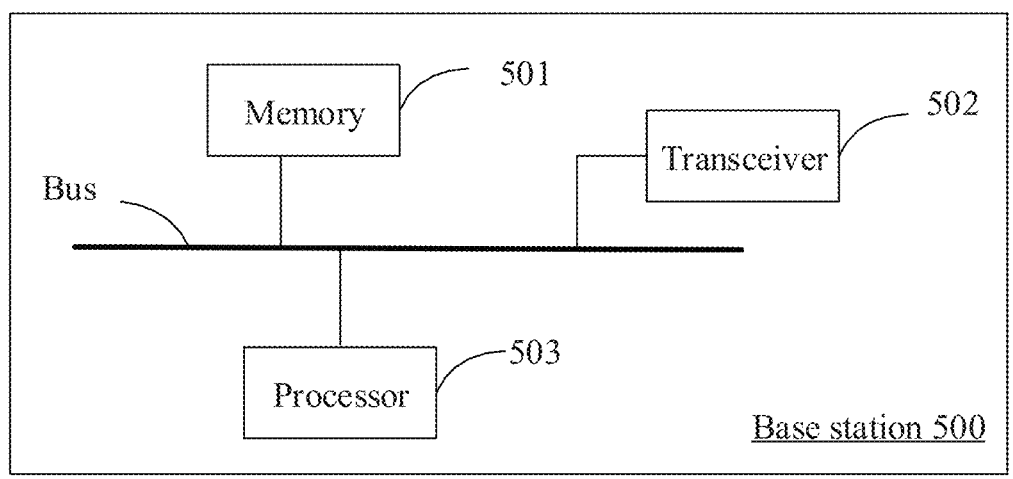
FIG. 14 is a structural diagram of a base station according to an embodiment of the present disclosure.

FIG. 14 is a structural diagram of a base station according to an embodiment of the present disclosure. The base station provided in this embodiment can execute the processing flow provided in the method embodiments on the base station side. As shown in FIG. 14. The base station 500 includes a memory 501, a transceiver 502 and a processor 503.

In FIG. 14, a bus architecture may include any number of interconnected buses and bridges. Specifically, various circuits of one or more processors represented by the processor 503 and a memory represented by the memory 501 are linked together. The bus architecture may also link various other circuits together, such as, a peripheral device, a voltage regulator and a power management circuit, which are well known in the art and will not be further described herein. The bus interface provides interfaces. The transceiver 502 may be multiple elements, including a transmitter and a receiver, providing a unit for communicating with various other devices via transmission media which include a wireless channel, a wired channel, an optical cable and other transmission media. The processor 503 is responsible for managing the bus architecture and general processing, and the memory 501 may store data used by the processor 503 when performing an operation.

The processor 503 may be a central processing unit (CPU), an application specific integrated circuit (Application Specific Integrated Circuit, ASIC), a field-programmable gate array (Field-Programmable Gate Array, FPGA), or a complex programmable logic device (Complex Programmable Logic Device, CPLD), and the processor may also adopt a multi-core architecture.

The memory 501 is configured to store a computer program: the transceiver 502 is configured to transmit and receive data under control of the processor 503; and the processor 503 is configured to read the computer program from the memory 501 and perform the following operations:

obtaining location information of a terminal, and determining, according to the location information of the terminal, a grid where the terminal is located from at least one type of preset grid of a near-field coverage range of the base station;

determining a target transmitting beam codebook according to the grid where the terminal is located and a base station transmitting beam codebook set corresponding to the preset grid, where the base station transmitting beam codebook set includes a transmitting beam codebook corresponding to each grid in the preset grid;

sending information of the target transmitting beam codebook to the terminal, where the information of the target transmitting beam codebook is associated with a target receiving beam codebook from a terminal receiving beam codebook set associated with the base station transmitting beam codebook set, and the target receiving beam codebook is configured for the terminal to receive a to-be-sent signal of the base station; and sending, using the target transmitting beam codebook, the to-be-sent signal to the terminal.

In one or more embodiments of the present disclosure, the preset grid includes an initial grid and at least one shifted grid, and each preset grid corresponds to one type of base station transmitting beam codebook set and one type of terminal receiving beam codebook set; where the shifted grid is generated by shifting the initial grid, and at least one target edge region of each grid in the initial grid is located in a central region of each grid in the shifted grid.

In one or more embodiments of the present disclosure, in the process of determining the target transmitting beam codebook according to the grid where the terminal is located and the base station transmitting beam codebook set corresponding to the preset grid, the processor 503 is configured to:

if it is determined that the terminal is located in a central region of any first grid in the initial grid, determine, from a base station transmitting beam codebook set corresponding to the initial grid, a transmitting beam codebook corresponding to the first grid as the target transmitting beam codebook: or if it is determined that the terminal is located in an edge region of any first grid in the initial grid, and it is determined that the terminal is located in a central region of any second grid in the shifted grid, determine, from a base station transmitting beam codebook set corresponding to the shifted grid, a transmitting beam codebook corresponding to the second grid as the target transmitting beam codebook.

In one or more embodiments of the present disclosure, in the process of sending the information of the target transmitting beam codebook to the terminal, the processor 503 is configured to:

send information of the base station transmitting beam codebook set and information of the target transmitting beam codebook to the terminal, where the information of the base station transmitting beam codebook set is associated with a terminal receiving beam codebook set.

In one or more embodiments of the present disclosure, in the process of sending the information of the target transmitting beam codebook to the terminal, the processor 503 is configured to:

send a first identifier corresponding to the base station transmitting beam codebook set corresponding to the preset grid and a second identifier corresponding to the target transmitting beam codebook to the terminal, where the first identifier is further configured to associate a terminal receiving beam codebook set associated with the base station transmitting beam codebook set, and the second identifier is further configured to associate the target receiving beam codebook from the terminal receiving beam codebook set that corresponds to the target transmitting beam codebook from the base station transmitting beam codebook set, through a preset mapping relationship between receiving and transmitting beam codebooks.

In one or more embodiments of the present disclosure, the processor 503 is further configured to:

divide the near-field coverage range of the base station into at least one type of preset grid;

configure, for the preset grid, a base station transmitting beam codebook set and a corresponding terminal receiving beam codebook set, and determining a preset mapping relationship between receiving and transmitting beam codebooks according to a correspondence between respective codebook from the base station transmitting beam codebook set and respective codebook from the corresponding terminal receiving beam codebook set; and broadcast the terminal receiving beam codebook set and the preset mapping relationship between receiving and transmitting beam codebooks to the terminal.

In one or more embodiments of the present disclosure, the preset mapping relationship between receiving and transmitting beam codebooks includes: one transmitting beam codebook corresponding to one receiving beam codebook, and/or, transmitting beam codebooks corresponding to one receiving beam codebook.

In one or more embodiments of the present disclosure, in the process of configuring, for the preset grid, the base station transmitting beam codebook set and the corresponding terminal receiving beam codebook set, the processor 503 is configured to:

configure, for each grid in the preset grid, a transmitting beam codebook and a corresponding receiving beam codebook, and beam focusing corresponding to a codebook configured for any grid covers the grid, where a transmitting beam codebook configured for respective grid in the preset grid constitutes the base station transmitting beam codebook set, and a receiving beam codebook configured for respective grid constitutes the base station transmitting beam codebook set.

In one or more embodiments of the present disclosure, in the process of dividing the near-field coverage range of the base station into the at least one type of preset grid, the processor 503 is configured to:

divide an initial grid for the near-field coverage range of the base station; and shift the initial grid by using at least one preset shifting manner to obtain at least one type of shifted grid, and at least one edge region of each grid in the initial grid is located in a central region of each grid in the at least one type of shifted grid.

In one or more embodiments of the present disclosure, in the process of dividing the initial grid for the near-field coverage range of the base station, the processor 503 is configured to:

divide the initial grid for the near-field coverage range of the base station in a rectangular coordinate system or a polar coordinate system.

In one or more embodiments of the present disclosure, in the process of dividing the initial grid for the near-field coverage range of the base station in the rectangular coordinate system or the polar coordinate system, the processor 503 is configured to:

divide, in the rectangular coordinate system by taking a location of the base station as an origin, the initial grid for the near-field coverage range of the base station at equal distances along an x-axis and a y-axis according to a beam focusing range; or divide, in the polar coordinate system by taking a location of the base station as a pole, the initial grid for the near-field coverage range of the base station with a preset angle and a preset distance at equal intervals according to a beam focusing range.

In one or more embodiments of the present disclosure, in the process of shifting the initial grid by using the at least one preset shifting manner to obtain the at least one type of shifted grid, the processor 503 is configured to:

for the initial grid in the rectangular coordinate system, shift the initial grid along a positive direction and/or a negative direction of an x-axis to obtain the at least one type of shifted grid, and an edge region of a preset range around a side parallel to a y-axis of each grid in the initial grid is located in a central region of each grid in the shifted grid; and/or shift the initial grid along a positive direction and/or a negative direction of a y-axis to obtain the at least one type of shifted grid, and an edge region of a preset range around a side parallel to an x-axis of each grid in the initial grid is located in a central region of each grid in the shifted grid; and/or shift the initial grid along at least one direction at a preset angle to an x-axis to obtain a shifted grid, and an edge region of a preset range around a vertex of each grid in the initial grid is located in a central region of each grid in the shifted grid.

In one or more embodiments of the present disclosure, in the process of shifting the initial grid by using the at least one preset shifting manner to obtain the at least one type of shifted grid, the processor 503 is configured to:

for the initial grid in the polar coordinate system, enlarge and/or reduce the initial grid along a polar axis with a pole as a center to obtain the at least one type of shifted grid, and an edge region of a preset range around an arc side of each grid in the initial grid is located in a central region of each grid in the shifted grid; and/or rotate the initial grid clockwise and/or counterclockwise with a pole as a center to obtain the at least one type of shifted grid, and an edge region of a preset range around a side along a polar diameter direction of each grid in the initial grid is located in a central region of each grid in the shifted grid; and/or enlarge and/or reduce the initial grid along a polar axis with a pole as a center, and rotate the initial grid clockwise and/or counterclockwise with the pole as a center, to obtain the at least one type of shifted grid, and an edge region of a preset range around a vertex of each grid in the initial grid is located in a central region of each grid in the shifted grid.

The base station provided in the embodiment of the present disclosure may be specifically used to execute the above method embodiments on the base station side, and the specific functions will not be repeated.

Figure 15:
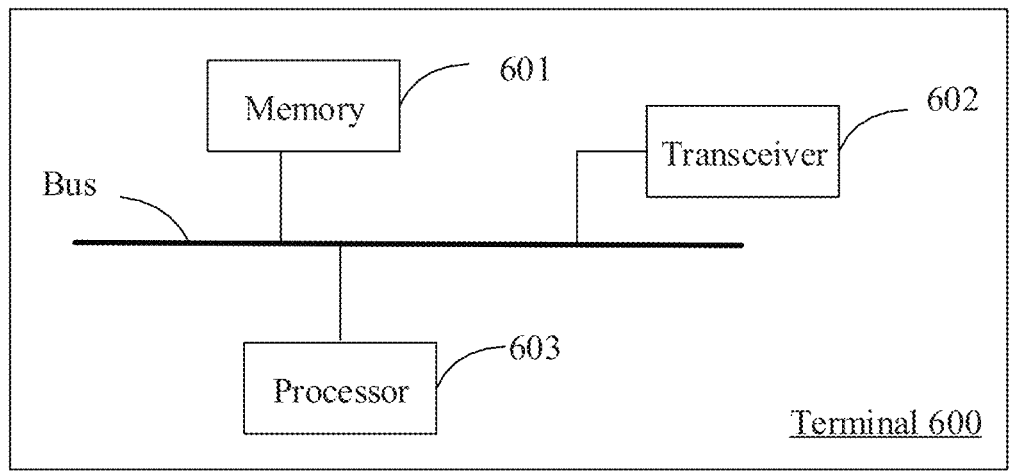
FIG. 15 is a structural diagram of a terminal according to an embodiment of the present disclosure.

FIG. 15 is a structural diagram of a terminal according to an embodiment of the present disclosure. The terminal provided in this embodiment can execute the processing flow provided in the method embodiments on the terminal side. As shown in FIG. 15, the terminal 600 includes a memory 601, a transceiver 602 and a processor 603.

In FIG. 15, a bus architecture may include any number of interconnected buses and bridges. Specifically, various circuits of one or more processors represented by the processor 603 and a memory represented by the memory 601 are linked together. The bus architecture may also link various other circuits together, such as a peripheral device, a voltage regulator and a power management circuit, which are well known in the art and will not be further described herein. The bus interface provides interfaces. The transceiver 602 may be multiple elements, including a transmitter and a receiver, providing a unit for communicating with various other devices via transmission media, which include a wireless channel, a wired channel, an optical cable and other transmission media. The processor 603 is responsible for managing the bus architecture and general processing, and the memory 601 may store data used by the processor 603 when performing an operation.

The processor 603 may be a central processing unit (CPU), an application specific integrated circuit (Application Specific Integrated Circuit, ASIC), a field-programmable gate array (Field-Programmable Gate Array, FPGA), or a complex programmable logic device (Complex Programmable Logic Device, CPLD), and the processor may also adopt a multi-core architecture.

The memory 601 is configured to store a computer program: the transceiver 602 is configured to transmit and receive data under control of the processor 603; and the processor 603 is configured to read the computer program from the memory 601 and perform the following operations:

receiving information of a target transmitting beam codebook sent by a base station: where the target transmitting beam codebook is a transmitting beam codebook corresponding to a grid where the terminal is located and being from a base station transmitting beam codebook set corresponding to a preset grid of a near-field coverage range of the base station;

determining, according to the information of the target transmitting beam codebook, a corresponding target receiving beam codebook from a terminal receiving beam codebook set corresponding to the preset grid; and controlling the transceiver to receive, using the target receiving beam codebook, a signal sent by the base station using the target transmitting beam codebook.

In one or more embodiments of the present disclosure, in the process of receiving the information of the target transmitting beam codebook sent by the base station, the processor 603 is configured to:

receive information of the base station transmitting beam codebook set and information of the target transmitting beam codebook sent by the base station; where the information of the base station transmitting beam codebook set is associated with the terminal receiving beam codebook set;

in the process of determining, according to the information of the target transmitting beam codebook, the corresponding target receiving beam codebook from the terminal receiving beam codebook set corresponding to the preset grid, the processor 603 is configured to:

determine, according to the information of the base station transmitting beam codebook set, the terminal receiving beam codebook set associated with the base station transmitting beam codebook set, and determining, according to the information of the target transmitting beam codebook, the corresponding target receiving beam codebook from the terminal receiving beam codebook set.

In one or more embodiments of the present disclosure, the information of the base station transmitting beam codebook set includes a first identifier corresponding to the base station transmitting beam codebook set including the target transmitting beam codebook: the information of the target transmitting beam codebook includes a second identifier corresponding to the target transmitting beam codebook:

in the process of determining, according to the information of the target transmitting beam codebook, the corresponding target receiving beam codebook from the terminal receiving beam codebook set corresponding to the preset grid, the processor 603 is configured to:

search for, according to the first identifier, the terminal receiving beam codebook set associated with the base station transmitting beam codebook set, and searching for, from the terminal receiving beam codebook set according to the second identifier and a preset mapping relationship between receiving and transmitting beam codebooks, the target terminal receiving beam codebook corresponding to the target transmitting beam codebook.

In one or more embodiments of the present disclosure, before receiving the information of the target transmitting beam codebook sent by the base station, the transceiver 602 is further configured to:

receive and store the terminal receiving beam codebook set and a preset mapping relationship between receiving and transmitting beam codebooks broadcast by the base station.

The terminal provided in the embodiment of the present disclosure may be specifically used to execute the above method embodiments on the terminal side, and the specific functions will not be repeated.

Figure 16:
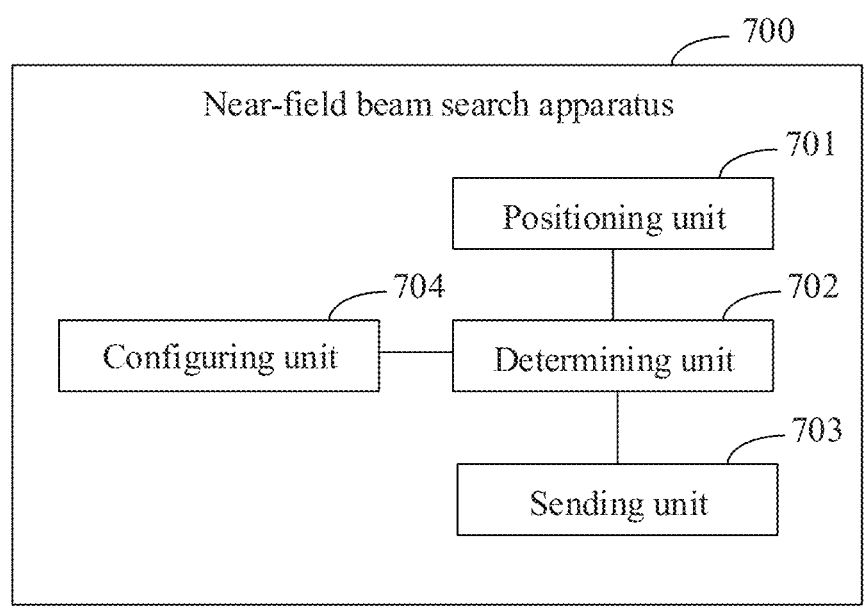
FIG. 16 is a structural diagram of a near-field beam search apparatus according to an embodiment of the present disclosure.

FIG. 16 is a structural diagram of a near-field beam search apparatus according to an embodiment of the present disclosure. The near-field beam search apparatus in this embodiment can execute the processing flow provided in the method embodiments on the base station side. As shown in FIG. 16. The near-field beam search apparatus 700 includes a positioning unit 701, a determining unit 702, and a sending unit 703.

The positioning unit 701 is configured to obtain location information of a terminal, and determine, according to the location information of the terminal, a grid where the terminal is located from at least one type of preset grid of a near-field coverage range of a base station:

the determining unit 702 is configured to determine a target transmitting beam codebook according to the grid where the terminal is located and a base station transmitting beam codebook set corresponding to the preset grid, where the base station transmitting beam codebook set includes a transmitting beam codebook corresponding to each grid in the preset grid; and the sending unit 703 is configured to send information of the target transmitting beam codebook to the terminal, where the information of the target transmitting beam codebook is associated with a target receiving beam codebook from a terminal receiving beam codebook set associated with the base station transmitting beam codebook set, and the target receiving beam codebook is configured for the terminal to receive a to-be-sent signal of the base station; and send, using the target transmitting beam codebook to the terminal, a signal associated with the target receiving beam codebook of the terminal.

In one or more embodiments of the present disclosure, the preset grid includes an initial grid and at least one shifted grid, and each preset grid corresponds to one type of base station transmitting beam codebook set and one type of terminal receiving beam codebook set; where the shifted grid is generated by shifting the initial grid, and at least one target edge region of each grid in the initial grid is located in a central region of each grid in the shifted grid.

In one or more embodiments of the present disclosure, in the process of determining the target transmitting beam codebook according to the grid where the terminal is located and the base station transmitting beam codebook set corresponding to the preset grid, the determining unit 702 is configured to:

if it is determined that the terminal is located in a central region of any first grid in the initial grid, determine, from a base station transmitting beam codebook set corresponding to the initial grid, a transmitting beam codebook corresponding to the first grid as the target transmitting beam codebook: or if it is determined that the terminal is located in an edge region of any first grid in the initial grid, and it is determined that the terminal is located in a central region of any second grid in the shifted grid, determine, from a base station transmitting beam codebook set corresponding to the shifted grid, a transmitting beam codebook corresponding to the second grid as the target transmitting beam codebook.

In one or more embodiments of the present disclosure, in the process of sending the information of the target transmitting beam codebook to the terminal, the sending unit 703 is configured to:

send information of the base station transmitting beam codebook set and information of the target transmitting beam codebook to the terminal, where the information of the base station transmitting beam codebook set is associated with a terminal receiving beam codebook set.

In one or more embodiments of the present disclosure, in the process of sending the information of the base station transmitting beam codebook set and the information of the target transmitting beam codebook to the terminal, the sending unit 703 is configured to:

send a first identifier corresponding to the base station transmitting beam codebook set corresponding to the preset grid and a second identifier corresponding to the target transmitting beam codebook to the terminal, where the first identifier is further configured to associate a terminal receiving beam codebook set associated with the base station transmitting beam codebook set, and the second identifier is further configured to associate the target receiving beam codebook from the terminal receiving beam codebook set that corresponds to the target transmitting beam codebook from the base station transmitting beam codebook set, through a preset mapping relationship between receiving and transmitting beam codebooks.

In one or more embodiments of the present disclosure, the apparatus further includes a configuring unit 704, configured to:

divide the near-field coverage range of the base station into at least one type of preset grid;

configure, for the preset grid, a base station transmitting beam codebook set and a corresponding terminal receiving beam codebook set, and determining a preset mapping relationship between receiving and transmitting beam codebooks according to a correspondence between respective codebook from the base station transmitting beam codebook set and respective codebook from the corresponding terminal receiving beam codebook set; and broadcast the terminal receiving beam codebook and the preset mapping relationship between receiving and transmitting beam codebooks to the terminal.

In one or more embodiments of the present disclosure, the preset mapping relationship between receiving and transmitting beam codebooks includes: one transmitting beam codebook corresponding to one receiving beam codebook, and/or, transmitting beam codebooks corresponding to one receiving beam codebook.

In one or more embodiments of the present disclosure, in the process of configuring, for the preset grid, the base station transmitting beam codebook set and the corresponding terminal receiving beam codebook set, the configuring unit 704 is configured to:

configure, for each grid in the preset grid, a transmitting beam codebook and a corresponding receiving beam codebook, and beam focusing corresponding to a codebook configured for any grid covers the grid, where a transmitting beam codebook configured for respective grid in the preset grid constitutes the base station transmitting beam codebook set, and a receiving beam codebook configured for respective grid constitutes the base station transmitting beam codebook set.

In one or more embodiments of the present disclosure, in the process of dividing the near-field coverage range of the base station into the at least one type of preset grid, the configuring unit 704 is configured to:

divide an initial grid for the near-field coverage range of the base station; and shift the initial grid by using at least one preset shifting manner to obtain at least one type of shifted grid, and at least one edge region of each grid in the initial grid is located in a central region of each grid in the at least one type of shifted grid.

In one or more embodiments of the present disclosure, in the process of dividing the initial grid for the near-field coverage range of the base station, the configuring unit 704 is configured to:

divide the initial grid for the near-field coverage range of the base station in a rectangular coordinate system or a polar coordinate system.

In one or more embodiments of the present disclosure, in the process of dividing the initial grid for the near-field coverage range of the base station in the rectangular coordinate system or the polar coordinate system, the configuring unit 704 is configured to:

divide, in the rectangular coordinate system by taking a location of the base station as an origin, the initial grid for the near-field coverage range of the base station at equal distances along an x-axis and a y-axis according to a beam focusing range: or divide, in the polar coordinate system by taking a location of the base station as a pole, the initial grid for the near-field coverage range of the base station with a preset angle and a preset distance at equal intervals according to a beam focusing range.

In one or more embodiments of the present disclosure, in the process of shifting the initial grid by using the at least one preset shifting manner to obtain the at least one type of shifted grid, the configuring unit 704 is configured to:

for the initial grid in the rectangular coordinate system, shift the initial grid along a positive direction and/or a negative direction of an x-axis to obtain the at least one type of shifted grid, and an edge region of a preset range around a side parallel to a y-axis of each grid in the initial grid is located in a central region of each grid in the shifted grid; and/or shift the initial grid along a positive direction and/or a negative direction of a y-axis to obtain the at least one type of shifted grid, and an edge region of a preset range around a side parallel to an x-axis of each grid in the initial grid is located in a central region of each grid in the shifted grid; and/or shift the initial grid along at least one direction at a preset angle to an x-axis to obtain a shifted grid, and an edge region of a preset range around a vertex of each grid in the initial grid is located in a central region of each grid in the shifted grid.

In one or more embodiments of the present disclosure, in the process of shifting the initial grid by using the at least one preset shifting manner to obtain the at least one type of shifted grid, the configuring unit 704 is configured to:

for the initial grid in the polar coordinate system, enlarge and/or reduce the initial grid along a polar axis with a pole as a center to obtain the at least one type of shifted grid, and an edge region of a preset range around an arc side of each grid in the initial grid is located in a central region of each grid in the shifted grid; and/or rotate the initial grid clockwise and/or counterclockwise with a pole as a center to obtain the at least one type of shifted grid, and an edge region of a preset range around a side along a polar diameter direction of each grid in the initial grid is located in a central region of each grid in the shifted grid; and/or enlarge and/or reduce the initial grid along a polar axis with a pole as a center, and rotate the initial grid clockwise and/or counterclockwise with the pole as a center, to obtain the at least one type of shifted grid, and an edge region of a preset range around a vertex of each grid in the initial grid is located in a central region of each grid in the shifted grid.

The near-field beam search apparatus provided in the embodiment of the present disclosure may be specifically used to execute the above method embodiments on the base station side, and the specific functions will not be repeated.

Figure 17:
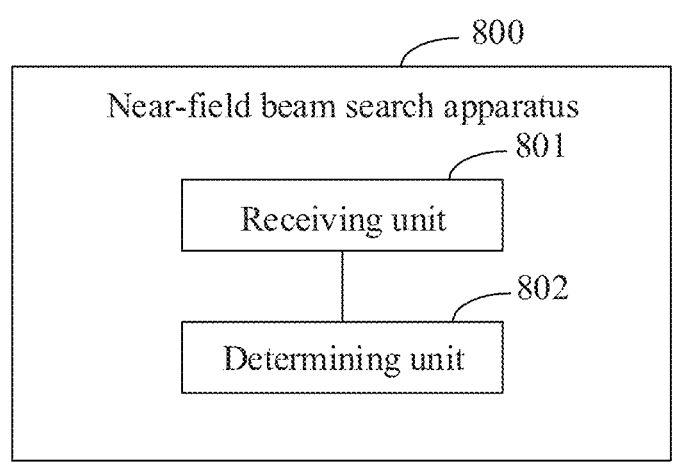
FIG. 17 is a structural diagram of a near-field beam search apparatus according to another embodiment of the present disclosure.

FIG. 17 is a structural diagram of a near-field beam search apparatus according to an embodiment of the disclosure. The near-field beam search apparatus provided in this embodiment can execute the processing flow provided in the method embodiments on terminal side. As shown in FIG. 17, the near-field beam search apparatus 800 includes a receiving unit 801 and a determining unit 802.

The receiving unit 801 is configured to receive information of a target transmitting beam codebook sent by a base station: where the target transmitting beam codebook is a transmitting beam codebook corresponding to a grid where a terminal is located and being from a base station transmitting beam codebook set corresponding to a preset grid of a near-field coverage range of the base station:

the determining unit 802 is configured to determine, according to the information of the target transmitting beam codebook, a corresponding target receiving beam codebook from a terminal receiving beam codebook set corresponding to the preset grid;

the receiving unit 801 is further configured to receive, using the target receiving beam codebook, a signal sent by the base station using the target transmitting beam codebook.

In one or more embodiments of the present disclosure, in the process of receiving the information of the target transmitting beam codebook sent by the base station, the receiving unit 801 is configured to:

receive information of the base station transmitting beam codebook set and information of the target transmitting beam codebook sent by the base station; where the information of the base station transmitting beam codebook set is associated with the terminal receiving beam codebook set;

in the process of determining, according to the information of the target transmitting beam codebook, the corresponding target receiving beam codebook from the terminal receiving beam codebook set corresponding to the preset grid, the determining unit 802 is configured to:

determine, according to the information of the base station transmitting beam codebook set, the terminal receiving beam codebook set associated with the base station transmitting beam codebook set, and determining, according to the information of the target transmitting beam codebook, the corresponding target receiving beam codebook from the terminal receiving beam codebook set.

In one or more embodiments of the present disclosure, the information of the base station transmitting beam codebook set includes a first identifier corresponding to the base station transmitting beam codebook set including the target transmitting beam codebook: the information of the target transmitting beam codebook includes a second identifier corresponding to the target transmitting beam codebook;

in the process of determining, according to the information of the target transmitting beam codebook, the corresponding target receiving beam codebook from the terminal receiving beam codebook set corresponding to the preset grid, the determining unit 802 is configured to:

search for, according to the first identifier, the terminal receiving beam codebook set associated with the base station transmitting beam codebook set, and search for, from the terminal receiving beam codebook set according to the second identifier and a preset mapping relationship between receiving and transmitting beam codebooks, the target terminal receiving beam codebook corresponding to the target transmitting beam codebook.

In one or more embodiments of the present disclosure, before receiving the information of the target transmitting beam codebook sent by the base station, the receiving unit 801 is further configured to:

receive and store the terminal receiving beam codebook set and a preset mapping relationship between receiving and transmitting beam codebooks broadcast by the base station.

The near-field beam search apparatus provided in the embodiment of the present disclosure may be specifically used to execute the above method embodiments on the terminal side, and the specific functions will not be repeated.

It should be noted that the division of units in the above embodiments of the present disclosure is illustrative, and it is only a logical function division, there may be other division manners in actual implementations. In addition, each functional unit in each embodiment of the present disclosure may be integrated in one processing unit, or may exist physically alone, or two or more units may be integrated in one unit. The above integrated unit may be implemented in a form of hardware or a software functional unit.

If the integrated unit is implemented in the form of a software functional unit and sold or used as an independent product, it may be stored in a processor-readable storage medium. Based on this understanding, in the embodiments of the present disclosure, the essence or the part that contributes to the prior art or all or part of the embodiments may be embodied in the form of a software product, and the computer software product is stored in a storage medium and includes several instructions to cause a computer device (which may be a personal computer, a server, or a network device, etc.) or a processor (processor) to perform all or a part of the steps of the methods described in the embodiments of the present disclosure. The aforementioned storage medium includes various media that can store program codes such as a USB flash disk, a mobile hard disk, a read-only memory (Read-only Memory, ROM), a random access memory (Random Access Memory, RAM), a magnetic disk or an optical disk.

Another embodiment of the present disclosure further provides a computer-readable storage medium storing a computer program, where the computer program is configured to cause a processor to perform the near-field beam search method on the terminal side or the base station side.

The computer-readable storage medium may be any available medium or data storage device that a processor can access, including but not limited to a magnetic memory (such as, a floppy disk, a hard disk, a magnetic tape, a magneto-optical disk (MO), etc.), an optical memory (such as, a compact disc (CD), a digital versatile disc (DVD), a Blu-ray disc (BD), a high-definition versatile Disc (HVD), etc.), and a semiconductor memory (such as, a ROM, an erasable programmable read only memory (EPROM), an electrically erasable programmable read only memory (EEPROM), a non-volatile memory (NAND FLASH), a solid state drive (SSD), etc.).

Another embodiment of the present disclosure further provides a computer program product, including a computer program for causing a processor to perform the near-field beam search method on the terminal side or the base station side.

The embodiments of the present disclosure may be provided as a method, a system, or a computer program product. Therefore, the present disclosure may take the form of a complete hardware embodiment, a complete software embodiment, or an embodiment combining software and hardware aspects. Moreover, the present disclosure may take the form of a computer program product implemented on one or more computer-usable storage media (including but not limited to a magnetic disk memory and an optical memory, etc.) including computer-usable program codes.

The present disclosure is described with reference to the flowcharts and/or the block diagrams of the methods, the devices (systems), and the computer program product according to the embodiments of the present disclosure. It should be understood that each flow and/or block in the flowcharts and/or block diagrams and the combination of a flow and/or a block in the flowcharts and/or the block diagrams can be implemented by computer-executable instructions. These computer-executable instructions can be provided to a general-purpose computer, a special-purpose computer, an embedded processor or a processor of other programmable data processing device to generate a machine, and the instructions executed by the computer or the processor of other programmable data processing device produce an apparatus for implementing the functions specified in one or more flows of a flowchart and/or one or more blocks of a block diagram.

These processor-executable instructions may also be stored in the processor-readable memory that can guide the computer or other programmable data processing device to work in a specific way, and the instructions stored in the processor-readable memory produce a manufactured product including an instruction apparatus, and the instruction apparatus implements the functions specified in one or more flows of a flowchart and/or one or more blocks of a block diagram.

These processor-executable instructions may also be loaded on a computer or other programmable data processing device, and a series of operation steps are performed on the computer or other programmable device to produce a computer-implemented process, and the instructions executed on the computer or other programmable device provide steps for implementing the functions specified in one or more flows of a flowchart and/or one or more blocks of a block diagram.

Various modifications and variations to the present disclosure without departing from the spirit and scope of the present disclosure. Thus, if these modifications and variations of the present disclosure are within the scope of the claims of the present disclosure and the equivalent technologies thereof, the present disclosure is intended to include these modifications and variations.

The invention claimed is:

1. A near-field beam search method, wherein the method is applied to a terminal and the method comprises:
   receiving information of a target transmitting beam codebook sent by a base station; wherein the target transmitting beam codebook is a transmitting beam codebook corresponding to a grid where the terminal is located and being from a base station transmitting beam codebook set corresponding to a preset grid of a near-field coverage range of the base station;
   determining, according to the information of the target transmitting beam codebook, a corresponding target receiving beam codebook from a terminal receiving beam codebook set corresponding to the preset grid; and
   receiving, using the target receiving beam codebook, a signal sent by the base station using the target transmitting beam codebook.

2. The method according to claim 1, wherein the receiving the information of the target transmitting beam codebook sent by the base station comprises:
   receiving information of the base station transmitting beam codebook set and information of the target transmitting beam codebook sent by the base station; wherein the information of the base station transmitting beam codebook set is associated with the terminal receiving beam codebook set;

the determining, according to the information of the target transmitting beam codebook, the corresponding target receiving beam codebook from the terminal receiving beam codebook set corresponding to the preset grid comprises:

determining, according to the information of the base station transmitting beam codebook set, the terminal receiving beam codebook set associated with the base station transmitting beam codebook set, and determining, according to the information of the target transmitting beam codebook, the corresponding target receiving beam codebook from the terminal receiving beam codebook set.

3. The method according to claim 2, wherein the information of the base station transmitting beam codebook set comprises a first identifier corresponding to the base station transmitting beam codebook set comprising the target transmitting beam codebook; the information of the target transmitting beam codebook comprises a second identifier corresponding to the target transmitting beam codebook;

the determining, according to the information of the target transmitting beam codebook, the corresponding target receiving beam codebook from the terminal receiving beam codebook set corresponding to the preset grid comprises:

searching for, according to the first identifier, the terminal receiving beam codebook set associated with the base station transmitting beam codebook set, and searching for, from the terminal receiving beam codebook set according to the second identifier and a preset mapping relationship between receiving and transmitting beam codebooks, the target receiving beam codebook corresponding to the target transmitting beam codebook.

4. The method according to claim 1, wherein before the receiving the information of the target transmitting beam codebook sent by the base station, the method further comprises:

receiving and storing the terminal receiving beam codebook set and a preset mapping relationship between receiving and transmitting beam codebooks broadcast by the base station.

5. A non-transitory processor-readable storage medium storing a computer program, wherein the computer program is configured to enable a processor to perform the method according to claim 1.

6. A near-field beam search method, wherein the method is applied to a base station and the method comprises:

obtaining location information of a terminal, and determining, according to the location information of the terminal, a grid where the terminal is located from at least one type of preset grid of a near-field coverage range of the base station;

determining a target transmitting beam codebook according to the grid where the terminal is located and a base station transmitting beam codebook set corresponding to the preset grid, wherein the base station transmitting beam codebook set comprises a transmitting beam codebook corresponding to each grid in the preset grid;

sending information of the target transmitting beam codebook to the terminal, wherein the information of the target transmitting beam codebook is associated with a target receiving beam codebook from a terminal receiving beam codebook set associated with the base station transmitting beam codebook set, and the target receiving beam codebook is configured for the terminal to receive a to-be-sent signal of the base station; and sending, using the target transmitting beam codebook, the to-be sent signal to the terminal.

7. The method according to claim 6, wherein the preset grid comprises an initial grid and at least one shifted grid, and each type of preset grid corresponds to one type of base station transmitting beam codebook set and one type of terminal receiving beam codebook set; wherein the shifted grid is generated by shifting the initial grid, and at least one target edge region of each grid in the initial grid is located in a central region of each grid in the shifted grid.

8. The method according to claim 7, wherein the determining the target transmitting beam codebook according to the grid where the terminal is located and the base station transmitting beam codebook set corresponding to the preset grid comprises:

if it is determined that the terminal is located in a central region of any first grid in the initial grid, determining, from a base station transmitting beam codebook set corresponding to the initial grid, a transmitting beam codebook corresponding to the first grid as the target transmitting beam codebook; or if it is determined that the terminal is located in an edge region of any first grid in the initial grid, and it is determined that the terminal is located in a central region of any second grid in the shifted grid, determining, from a base station transmitting beam codebook set corresponding to the shifted grid, a transmitting beam codebook corresponding to the second grid as the target transmitting beam codebook.

9. The method according to claim 7, wherein the sending the information of the target transmitting beam codebook to the terminal comprises:

sending information of the base station transmitting beam codebook set and information of the target transmitting beam codebook to the terminal, wherein the information of the base station transmitting beam codebook set is associated with a terminal receiving beam codebook set.

10. The method according to claim 9, wherein the sending the information of the base station transmitting beam codebook set and the information of the target transmitting beam codebook to the terminal comprises:

sending a first identifier corresponding to the base station transmitting beam codebook set corresponding to the preset grid and a second identifier corresponding to the target transmitting beam codebook to the terminal, wherein the first identifier is configured to associate a terminal receiving beam codebook set associated with the base station transmitting beam codebook set, and the second identifier is configured to associate the target receiving beam codebook from the terminal receiving beam codebook set that corresponds to the target transmitting beam codebook from the base station transmitting beam codebook set, through a preset mapping relationship between receiving and transmitting beam codebooks.

11. The method according to claim 7, further comprising:

dividing the near-field coverage range of the base station into at least one type of preset grid;

configuring, for the preset grid, a base station transmitting beam codebook set and a corresponding terminal receiving beam codebook set, and determining a preset mapping relationship between receiving and transmitting beam codebooks according to a correspondence between respective codebook from the base station transmitting beam codebook set and respective codebook from the corresponding terminal receiving beam codebook set; and broadcasting the terminal receiving beam codebook set and the preset mapping relationship between receiving and transmitting beam codebooks to the terminal.

12. The method according to claim 11, wherein the preset mapping relationship between receiving and transmitting beam codebooks comprises: one transmitting beam codebook corresponding to one receiving beam codebook, and/or, a plurality of transmitting beam codebooks corresponding to one receiving beam codebook.

13. The method according to claim 12, wherein the configuring, for the preset grid, the base station transmitting beam codebook set and the corresponding terminal receiving beam codebook set comprises:

configuring, for each grid in the preset grid, a transmitting beam codebook and a corresponding receiving beam codebook, wherein beam focusing corresponding to a codebook configured for any grid covers the grid, wherein a transmitting beam codebook configured for respective grid in the preset grid constitutes the base station transmitting beam codebook set, and a receiving beam codebook configured for respective grid constitutes the terminal receiving beam codebook set.

14. The method according to claim 11, wherein the dividing the near-field coverage range of the base station into the at least one type of preset grid comprises:

dividing an initial grid for the near-field coverage range of the base station; and shifting the initial grid by using at least one preset shifting manner to obtain at least one type of shifted grid, wherein at least one edge region of each grid in the initial grid is located in a central region of each grid in the at least one type of shifted grid.

15. The method according to claim 14, wherein the dividing the initial grid for the near-field coverage range of the base station comprises:

dividing the initial grid for the near-field coverage range of the base station in a rectangular coordinate system or a polar coordinate system.

16. The method according to claim 15, wherein the dividing the initial grid for the near-field coverage range of the base station in the rectangular coordinate system or the polar coordinate system comprises:

dividing, in the rectangular coordinate system by taking a location of the base station as an origin, the initial grid for the near-field coverage range of the base station at equal distances along an x-axis and a y-axis according to a beam focusing range; or dividing, in the polar coordinate system by taking a location of the base station as a pole, the initial grid for the near-field coverage range of the base station with a preset angle and a preset distance at equal intervals according to a beam focusing range.

17. The method according to claim 15, wherein the shifting the initial grid by using the at least one preset shifting manner to obtain the at least one type of shifted grid comprises:

for the initial grid in the rectangular coordinate system,
shifting the initial grid along a positive direction and/or a negative direction of an x-axis to obtain the at least one type of shifted grid, wherein an edge region of a preset range around a side parallel to a y-axis of each grid in the initial grid is located in a central region of each grid in the shifted grid; and/or shifting the initial grid along a positive direction and/or a negative direction of a y-axis to obtain the at least one type of shifted grid, wherein an edge region of a preset range around a side parallel to an x-axis of each grid in the initial grid is located in a central region of each grid in the shifted grid; and/or shifting the initial grid along at least one direction at a preset angle to an x-axis to obtain a shifted grid, wherein an edge region of a preset range around a vertex of each grid in the initial grid is located in a central region of each grid in the shifted grid;

for the initial grid in the polar coordinate system, enlarging and/or reducing the initial grid along a polar axis with a pole as a center to obtain the at least one type of shifted grid, wherein an edge region of a preset range around an arc side of each grid in the initial grid is located in a central region of each grid in the shifted grid; and/or rotating the initial grid clockwise and/or counterclockwise with a pole as a center to obtain the at least one type of shifted grid, wherein an edge region of a preset range around a side along a polar diameter direction of each grid in the initial grid is located in a central region of each grid in the shifted grid; and/or enlarging and/or reducing the initial grid along a polar axis with a pole as a center, and rotating the initial grid clockwise and/or counterclockwise with the pole as a center, to obtain the at least one type of shifted grid, wherein an edge region of a preset range around a vertex of each grid in the initial grid is located in a central region of each grid in the shifted grid.

18. A base station comprising a memory, a transceiver, and a processor, wherein the memory is configured to store a computer program; the transceiver is configured to transmit and receive data under control of the processor; and the processor is configured to read the computer program from the memory to perform the method according to claim 6.

19. A non-transitory processor-readable storage medium storing a computer program, wherein the computer program is configured to enable a processor to perform the method according to claim 6.

20. A terminal, comprising a memory, a transceiver, and a processor, wherein the memory is configured to store a computer program; the transceiver is configured to transmit and receive data under control of the processor; and the processor is configured to read the computer program from the memory and perform following operations;

receiving information of a target transmitting beam codebook sent by a base station; wherein the target transmitting beam codebook is a transmitting beam codebook corresponding to a grid where the terminal is located and being from a base station transmitting beam codebook set corresponding to a preset grid of a near-field coverage range of the base station;

determining, according to the information of the target transmitting beam codebook, a corresponding target receiving beam codebook from a terminal receiving beam codebook set corresponding to the preset grid; and controlling the transceiver to receive, using the target receiving beam codebook, a signal sent by the base station using the target transmitting beam codebook.

* * * * *